(12) United States Patent
Tucci

(10) Patent No.: US 8,595,637 B2
(45) Date of Patent: Nov. 26, 2013

(54) ELECTRONIC FLASHCARDS

(76) Inventor: Victoria Ann Tucci, Watsonville, CA (US)

( * ) Notice: Subject to any disclaimer, the term of this patent is extended or adjusted under 35 U.S.C. 154(b) by 0 days.

(21) Appl. No.: 13/187,419

(22) Filed: Jul. 20, 2011

(65) Prior Publication Data

US 2011/0275050 A1 Nov. 10, 2011

Related U.S. Application Data

(63) Continuation of application No. 11/900,898, filed on Sep. 14, 2007, now Pat. No. 8,108,786.

(60) Provisional application No. 60/963,342, filed on Aug. 2, 2007.

(51) Int. Cl.
*G06F 3/14* (2006.01)

(52) U.S. Cl.
USPC ........ 715/764; 715/751; 713/166; 348/231.3; 436/34; 434/129; 434/178; 434/188; 434/322; 434/362

(58) Field of Classification Search
USPC .......... 715/200–277, 700–867; 700/701–866; 709/201–229; 705/50–79; 345/30–111; 348/206–231.9; 707/200–206; 434/178, 322
See application file for complete search history.

(56) References Cited

U.S. PATENT DOCUMENTS

| 2003/0129574 A1* | 7/2003 | Ferriol et al. | 434/362 |
| 2007/0190512 A1* | 8/2007 | Meimer et al. | 434/322 |
| 2007/0248938 A1* | 10/2007 | Ronald | 434/178 |

* cited by examiner

*Primary Examiner* — Ruay Ho

(57) ABSTRACT

A method, computer-readable medium and system for implementing electronic flashcards are disclosed. The method is capable of generating data operable to display a first set of information in a first region of a graphical user interface, in which the data is further operable to cause a display of the first set of information while a second set of information is not displayed. The first and second sets of information are associated with a first electronic flashcard. Data operable to display the second set of information in a second region of the graphical user interface is generated, in which the data is further operable to cause a display of the second set of information responsive to a request to display the second set of information. Data operable to display a second electronic flashcard in a third region of the graphical user interface is generated.

24 Claims, 30 Drawing Sheets

700

TUCCI

Bryan :: Unit 1 / Glossary

CLM GLOSSARY FOR UNITS  [Find]  [Show All]  [Print]  ← Return to CLM Unit
770   780   790

| Term | Definition | Key Words | Task |
|---|---|---|---|
| CLM Team Management Process | The Team Management binder contains a se... | CLM Products | |
| 0.001 Talker (echoic) | Leaner repeats T modeled word (i.e., no... | CLRA Facts | |
| 0.002 Talker (mand>echoic) | Learner repeats playful sounds or words... | CLRA Facts | |
| 0.102 Observer (tact) | Learner labels each picture touched by T... | CLRA Facts | |
| 0.201 Problem Solver (mand) | Learner spontaneously asks for an item o... | CLRA Facts | |
| 0.203 Problem Solver (mand) | Learner uses acceptable motor or vocal b... | CLRA Facts | |
| 0.301 Reader (echoic) | Learner repeats the T read word or appro... | CLRA Facts | |
| 0.401 Writer (imitates line) | Learner imitates modeled stroke on large... | CLRA Facts | |
| 0.501 Participator (teacher-directed) | "Valued instructor" presents a series of... | CLRA Facts | |
| 0.502 Participator (teacher-directed) | Leaner responds on signal for 3 consecu... | CLRA Facts | |
| 0.503 Participator (semi-directed) | Teacher assigns a FIRM task, remains nea... | CLRA Facts | |

| | TUCCI Bryan :: Unit 1 / Glossary | | | |
|---|---|---|---|---|
| | CLM GLOSSARY FOR UNITS   [Find]   [Show All]   [Print]    ← Return to CLM Unit | | | |
| | 770    780    790 | | | |

| | Term | Definition | Key Words | Task |
|---|---|---|---|---|
| ⏵ | 0.503 Participator (semi-directed) | Teacher instructs learner to perform a f... | SAFEMEDS | |
| ⏵ | 0.504 Participator (peer-directed) | Leaner accepts item from a peer or give... | CLRA Facts | |
| ⏵ | 0.505 Participator (n-d: Transitions) | Leaner selects a variety of object(s),... | CLRA Facts | |
| ⏵ | 0.601 Listener (adhere to) | Learner performs a set of 5-7 FIRM singl... | CLRA Facts | |
| ⏵ | 0.602 Listener (adhere to-touch) | Leaner touches each named picture when... | CLRA Facts | |
| ⏵ | 0.702 Observer (match to sample) | Leaner compares each picture in his/her... | CLRA Facts | |
| ⏵ | 0.703 Observer (sorting) | Leaner sorts pictures into three separa... | CLRA Facts | |
| ⏵ | 0.801 Problem Solver (operate) | Leaner manipulates a part of an object... | CLRA Facts | |
| ⏵ | 1.001 Talker (echoic) | Leaner repeats modeled simple sentence... | CLRA Facts | |

TUCCI

| About Us | CLM | Company | Products & Services | Downloads | Future | Mission Statement |

Virtual Coaching

The Tucci Team

Coaches

Coach 5
Coach 5 specializes in cabinet making. He has 20 years of cabinet making experience.
(Request a Session)   Availability: Mon Tues Thrus Fri

Coach 4
Coach 4 specializes in HVAC systems.
(Request a Session)   Availability: Mon Thrus

Coach 3
Coach 3 specializes in teaching and working with children.
(Request a Session)   Availability: Mon Fri

Coach 2
Coach 2 specializes in basket weaving.
(Request a Session)   Availability: Mon Wed

Coach 1
Coach specializes in plumbing.
(Request a Session)   Availability: Mon Thrus Coaches >
Subscribe
(Forum)
1530

(Click here to log in.)

TUCCI

The Tucci Team: Request a Virtual Coaching Session

Virtual Coaching

To request a Virtual Coaching session with Coach 1, please fill out this form then click on the "Submit" button on the bottom.

Test is available:

My Preferred Days/Times:

1st Choice -Choose day of week- ✓ -Time- ✓

Mon:    2nd Choice -Choose day of week- ✓ -Time- ✓

1620

-Choose your time zone- ✓

Tues: 11AM-3PM

Coaches >

Forum

Message (if any):

Weds:

Logged in as Bryan

Thurs: 2PM-5PM

You have 50 minutes of Virtual Coaching remaining

Fri:

1630

Log Out

Sat:

Sun:

Send Request    1640

TUCCI

| About Us | CLM | Company | Products & Services | Downloads | Future | Mission Statement |

Virtual Coaching

My Details
Manage Users >
Forum

Logged in as Coach 1

Log Out

Coach Administration area : User Administration

| Name | Units Access | Virtual Coaching Minutes |
|---|---|---|
| ▶ Luc | 3 | 150 |
| ▶ Kevin | 112 | 100 |
| ▶ Tester | 3 | 0 |
| ▶ Terry | 201 | 1 |
| ▶ My test client | 12 | 0 |
| ▶ Testing User | 3 | 100 |
| ▶ Bryan | 100 | 50 |
| ▶ | | 0 |
| ▶ | | 0 |
| ▶ | | 0 |
| ▶ | | 0 |
| ▶ | | 0 |
| ▶ | | 0 |

1740　1710　1720　1730

FIGURE 17

ELECTRONIC FLASHCARDS

RELATED APPLICATIONS

The present application is a continuation of U.S. patent application Ser. No. 11/900,989, filed Sep. 14, 2007, entitled "ELECTRONIC FLASHCARDS," naming Victoria A. Tucci as the inventor, which claims the benefit of U.S. Provisional Patent Application No. 60/963,342, filed Aug. 2, 2007, entitled "INTERACTIVE LEARNING TOOL AND ELECTRONIC FLASH CARDS," naming Vicci Tucci as the inventor, assigned to the assignee of the present invention. These applications are incorporated herein by reference in their entirety and for all purposes.

The present application is related to U.S. patent application Ser. No. 11/900,953, filed Sep. 14, 2007, entitled "INTERACTIVE EDUCATIONAL TOOL," naming Victoria A. Tucci as the inventor, assigned to the assignee of the present invention. That application is incorporated herein by reference in its entirety and for all purposes.

BACKGROUND OF THE INVENTION

Flash cards are often used to memorize or otherwise learn information. For example, a term may be written on the front side of a conventional flash card and a definition of the term may be written on the back side. As such, a user can flip the card back and forth to test the user's knowledge of the term and/or definition.

To improve upon conventional flash cards and provide users guidance in using the flash cards, SAFMEDS cards were developed. Conventional SAFMEDS cards are paper cards with writing on both sides similar to a conventional flash card, thereby enabling a user to flip each SAFMEDS card to learn the information written on the SAFMEDS cards. However, SAFMEDS cards are intended to be used in a specific manner as indicated by the phrase "say all fast one minute every day shuffled," from which the "SAFMEDS" acronym was derived. As such, users should go through all SAFMEDS cards in the SAFMEDS deck quickly using brief sessions of approximately one minute. The sessions should be performed often, with at least one session per day. Additionally, the cards should be shuffled before each of the sessions.

Despite their popularity, conventional flashcards and conventional SAFMEDS cards require a significant amount of time and effort to create. Conventional flash cards and SAFMEDS cards are also susceptible to damage, loss and theft. Additionally, SAFMEDS cards are difficult to shuffle, especially when a large SAFMEDS deck is used. Further, the use of a SAFMEDS deck with a large number of SAFMEDS cards increases the length of review sessions and makes it more difficult to learn more troublesome material.

SUMMARY OF THE INVENTION

Accordingly, a need exists for flashcards which can be created with less time and effort. Additionally, a need exists for a flashcard system which is less susceptible to damage, loss, and theft. A need also exists for SAFMEDS cards which are easier to shuffle. Further, a need exists for SAFMEDS cards which can be reviewed in shorter review sessions and reduce the difficulty of learning more troublesome material. Embodiments of the present invention provide novel solutions to these needs and others as described below.

Embodiments are directed to graphical user interfaces, systems, and methods of implementing electronic flashcards. More specifically, embodiments provide an interface for enabling information on a selected side of an electronic flashcard (e.g., SAFMEDS card) to be displayed and hidden. For example, the information on a first side of an electronic flashcard (e.g., comprising a term, phrase, picture, etc.) may be displayed while the information on the second side is hidden, thereby enabling a user to test himself or herself before revealing the information on the second side of the electronic flashcard (e.g., comprising a definition of a term on the first side, additional information about the information on the first side, etc.). As such, the electronic flashcards are less likely to be damaged, lost, or stolen given that they are in electronic form. Additionally, the electronic flashcards enable the learning of more material or content (e.g., accessed from a local computer system presenting the electronic flashcards, accessed from a remote computer system, etc.) than conventional flashcards. Additionally, the information on each side of the electronic flashcards may be automatically generated (e.g., based upon a lesson plan of another module, based upon a user-defined subject matter, etc.) in one embodiment, thereby reducing the time and effort to create the flashcards.

The interface may also enable placement or storage of inactive electronic flashcards (e.g., which are not currently being viewed or used) in multiple piles or stacks. For example, electronic flashcards which have not yet been viewed may be displayed (e.g., stored) in a first pile (e.g., automatically as the subject matter of the flashcard is encountered during a lesson), while previously viewed flashcards may be displayed (e.g., stored) in one or more additional stacks. In one embodiment, the additional stacks may enable users to sort the electronic flashcards based upon user-confidence level with the subject matter of the flashcards, differences in the subject matter of the flashcards, etc. As such, users may separate the electronic flashcards with more difficult or troublesome subject matter, thereby enabling users to focus on the more troublesome material while devoting less attention to the material which the user is more comfortable with. Additionally, the interface may limit the number of flashcards in one or more of the stacks, thereby reducing the review time for each pile and enabling users to more quickly and easily learn the material. Further, the interface may perform automated shuffling of the electronic flashcards, thereby providing more randomized and improved shuffling over manual shuffling of conventional flashcards.

In one embodiment, a graphical user interface for implementing electronic flashcards includes a first region for displaying a first set of information associated with a predetermined subject matter (e.g., a word, a phrase, and a picture, etc.), wherein the first set of information is associated with a selected electronic flashcard. The graphical user interface also includes a second region for displaying a second set of information associated with the predetermined subject matter (e.g., a definition of the first set of information, additional information about the first set of information, etc.), wherein the second set of information is related to the first set of information and associated with a selected electronic flashcard. The second set of information remains hidden until the display of the second set of information is initiated by a user. The graphical user interface may also include a first graphical object for flipping the selected electronic flashcard, wherein the first region is further operable to display the second set of information in response to a user interaction with the first graphical object, and wherein the second region is further operable to display the first set of information in response to a user input requesting display of the first set of information. Additionally, the graphical user interface may also include a third region for displaying inactive electronic flashcards, and wherein the first set of information is displayed in the first region in response to a selection of the selected electronic flashcard from the inactive electronic flashcards displayed in the third region. The selected electronic flashcard may include a visual representation of a SAFMEDS card, and wherein the graphical user interface may further include a third region for displaying inactive electronic flashcards, wherein the third region may include a first section for displaying electronic flashcards which have not yet been accessed by a user, and wherein the third region may further include a plurality of additional sections for displaying electronic flashcards which have been previously accessed by a user.

In another embodiment, a method of implementing electronic flashcards using a graphical user interface includes displaying a first set of information associated with a predetermined subject matter while a second set of information associated with a predetermined subject matter remains hidden, wherein the first set of information is displayed in a first region of the graphical user interface, wherein the second set of information is related to the first set of information, and wherein the first and second sets of information are associated with a selected electronic flashcard. In response to a user input requesting display of the second set of information, the method also includes displaying the second set of information associated with the predetermined subject matter, wherein the second set of information is displayed on a second region of the graphical user interface. The selected electronic flashcard may include a visual representation of a SAFMEDS card, and wherein the method further includes displaying inactive electronic flashcards in a third region of the graphical user interface. The method may also include automatically hiding the second set of information after a predetermined duration following the display of the second set of information.

And in yet another embodiment, a computer system includes a processor coupled to a memory, wherein the memory includes instructions that when executed on the processor implement a method of implementing electronic flashcards using a graphical user interface, wherein the method includes displaying a first set of information associated with a predetermined subject matter while a second set of information associated with a predetermined subject matter remains hidden, wherein the first set of information is displayed in a first region of the graphical user interface, wherein the second set of information is related to the first set of information, and wherein the first and second sets of information are associated with a selected electronic flashcard. In response to a user input requesting display of the second set of information, the method also includes displaying the second set of information associated with the predetermined subject matter, wherein the second set of information is displayed on a second region of the graphical user interface. The selected electronic flashcard may include a visual representation of a SAFMEDS card, and wherein the method further includes displaying inactive electronic flashcards in a third region of the graphical user interface. The method may also include automatically hiding the second set of information after a predetermined duration following the display of the second set of information.

BRIEF DESCRIPTION OF THE DRAWINGS

The present invention is illustrated by way of example, and not by way of limitation, in the figures of the accompanying drawings and in which like reference numerals refer to similar elements.

FIG. 7 shows an exemplary GUI comprising a list of terms with respective definitions in accordance with one embodiment of the present invention.

FIG. 15 shows an exemplary GUI for listing coaches or professors in accordance with one embodiment of the present invention.

FIG. 16 shows an exemplary GUI for enabling a student to request a session with a coach or professor in accordance with one embodiment of the present invention.

FIG. 17 shows an exemplary GUI for enabling a coach or professor to view students and setup a session with a student in accordance with one embodiment of the present invention.

DETAILED DESCRIPTION OF THE INVENTION

Figure 1:
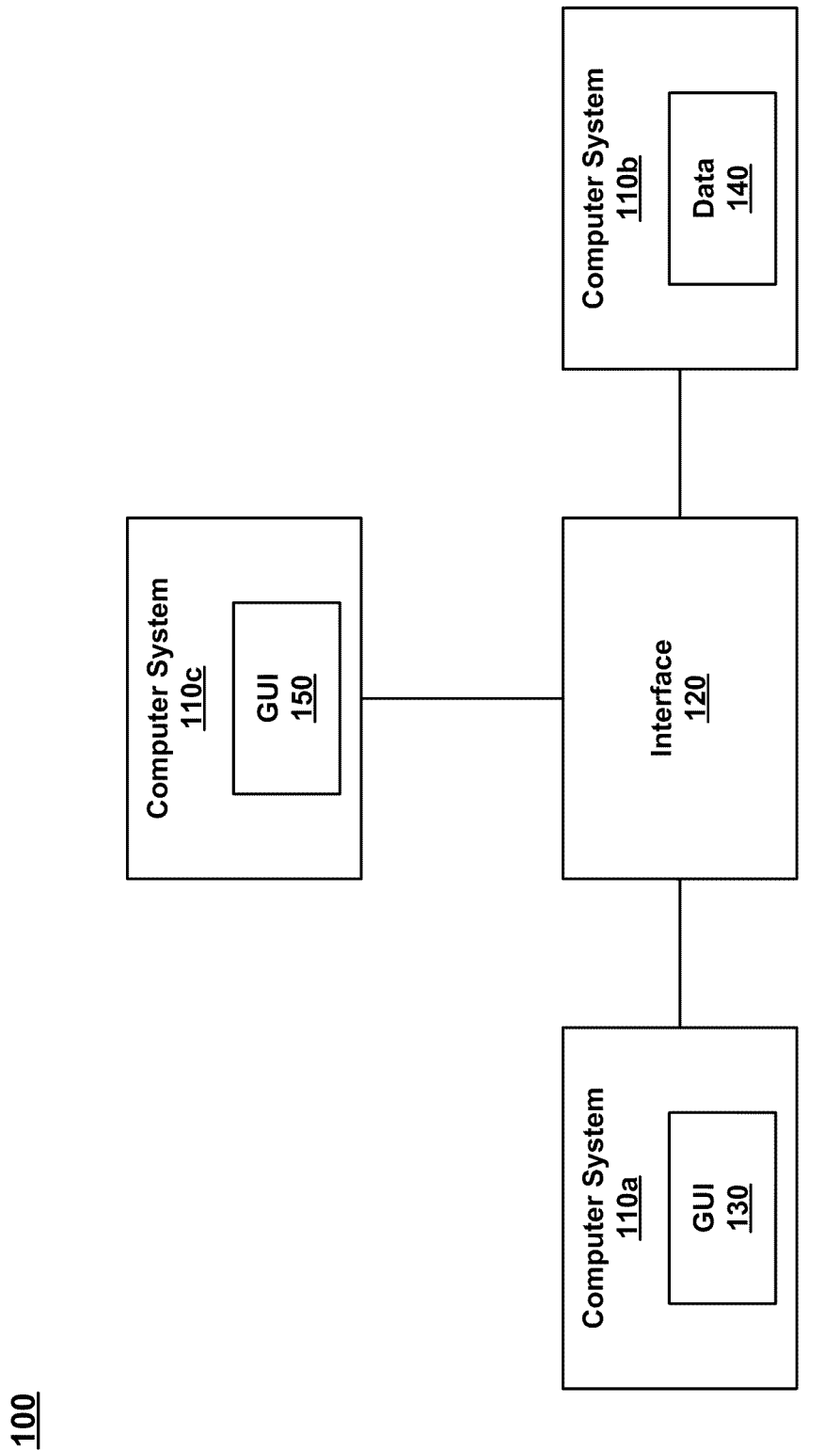
FIG. 1 shows an exemplary system for presenting a graphical user interface (GUI) in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "calculating," "capturing," "combining," "comparing," "collecting," "creating," "defining," "depicting," "detecting," "determining," "displaying," "establishing," "executing," "flipping," "generating," "grouping," "hiding," "identifying," "initiating," "interacting," "modifying," "monitoring," "moving," "outputting," "performing," "placing," "presenting," "processing," "programming," "querying," "removing," "repeating," "sampling," "sorting," "storing," "subtracting," "tracking," "transforming," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System for Implementing a Graphical User Interface

FIG. 1 shows exemplary system 100 for presenting a graphical user interface (GUI) in accordance with one embodiment of the present invention. As shown in FIG. 1, computer systems 110a-110c are communicatively coupled by interface 120. Interface 120 may comprise the internet, a network, or some other device/component for communicatively coupling computer systems 110a-110c. Additionally, computer system 110a may present GUI 130, whereas computer system 110c may present GUI 150. Data 140 may be accessed from computer system 110b (e.g., via interface 120) for generating GUI 130 and/or GUI 150, where computer system 110b may comprise a remote server in one embodiment. Alternatively, data for generating GUI 130 and/or GUI 150 may be accessed locally from a respective computer system (e.g., 110a, 110c, etc.), remotely from a computer system other than computer system 110b, etc.

GUI 130 may comprise an interactive educational tool (e.g., as discussed with respect to FIGS. 3-14 below) for enabling users to interact with content associated with a predetermined subject matter (e.g., a topic or subject of a lesson plan selected by a user). In one embodiment, the content may comprise media (e.g., video, still images, sound, etc.) which is simultaneously displayed with text or other information associated with the predetermined subject matter. GUI 130 and/or the content presented using GUI 130 may be generated from data (e.g., 140) accessed from a remote computer system (e.g., 110b). Where interface 120 comprises the internet, the interactive educational tool implemented using GUI 130 may comprise an online interactive educational tool (e.g., presented using a web browser of computer system 110a). As such, remote access of information may enable GUI 130 to present additional and/or different content compared to conventional solutions, while presentation of multiple forms of content using GUI 130 may enable users to more conveniently, effectively, and efficiently learn subject matter presented using GUI 130.

In another embodiment, system 100 may implement a remote observation and evaluation interface (e.g., as discussed with respect to FIGS. 15-20 below) for observing and evaluating (e.g., in real-time) a student's performance when performing an action or task associated with the predetermined subject matter (e.g., presented using the interactive educational tool implemented by GUI 130 as discussed above). Computer system 110c may present video and/or audio information (e.g., using GUI 150) of the student's performance accessed or captured using at least one interface device (e.g., a camera, microphone, etc.) coupled to computer system 110a. The video and/or audio information may be communicated via a communication channel (e.g., implemented using interface 120 and/or other networking components) formed between computer systems 110a and 110c. In addition to enabling observation and/or evaluation of the student, a scheduling interface may be presented to the user for scheduling the session with the professor. Further, a timing interface may be presented to the professor for enabling the professor to time the student and/or automatically bill the student based upon the duration of the session.

Alternatively, GUI 130 may comprise an interface for enabling information on a selected side of an electronic flashcard (e.g., SAFMEDS card) to be displayed and hidden. For example, the information on a first side of an electronic flashcard (e.g., comprising a term, phrase, picture, etc.) may be displayed while the information on the second side is hidden, thereby enabling a user to test himself or herself before revealing the information on the second side of the electronic flashcard (e.g., comprising a definition of a term on the first side, additional information about the information on the first side, etc.). GUI 130 may also enable placement or storage of inactive electronic flashcards (e.g., which are not currently being viewed or used) in multiple decks or piles (e.g., based upon user-confidence level with the subject matter of the flashcards, differences in the subject matter of the flashcards, etc.) to improve learning of the material (e.g., by enabling users to focus study efforts on more troublesome material of flashcards placed in a given pile). Further, GUI 130 may enable automated shuffling of the electronic flashcards, thereby providing more randomized and improved shuffling over manual shuffling of conventional flashcards.

Although FIG. 1 shows three computer systems (e.g., 110*a*-110*c*) coupled via interface 120, it should be appreciated that a larger or smaller number of computer systems may be coupled via interface 120 in other embodiments. Additionally, it should be appreciated that interface 120 may comprise more than one component in other embodiments.

Figure 2:
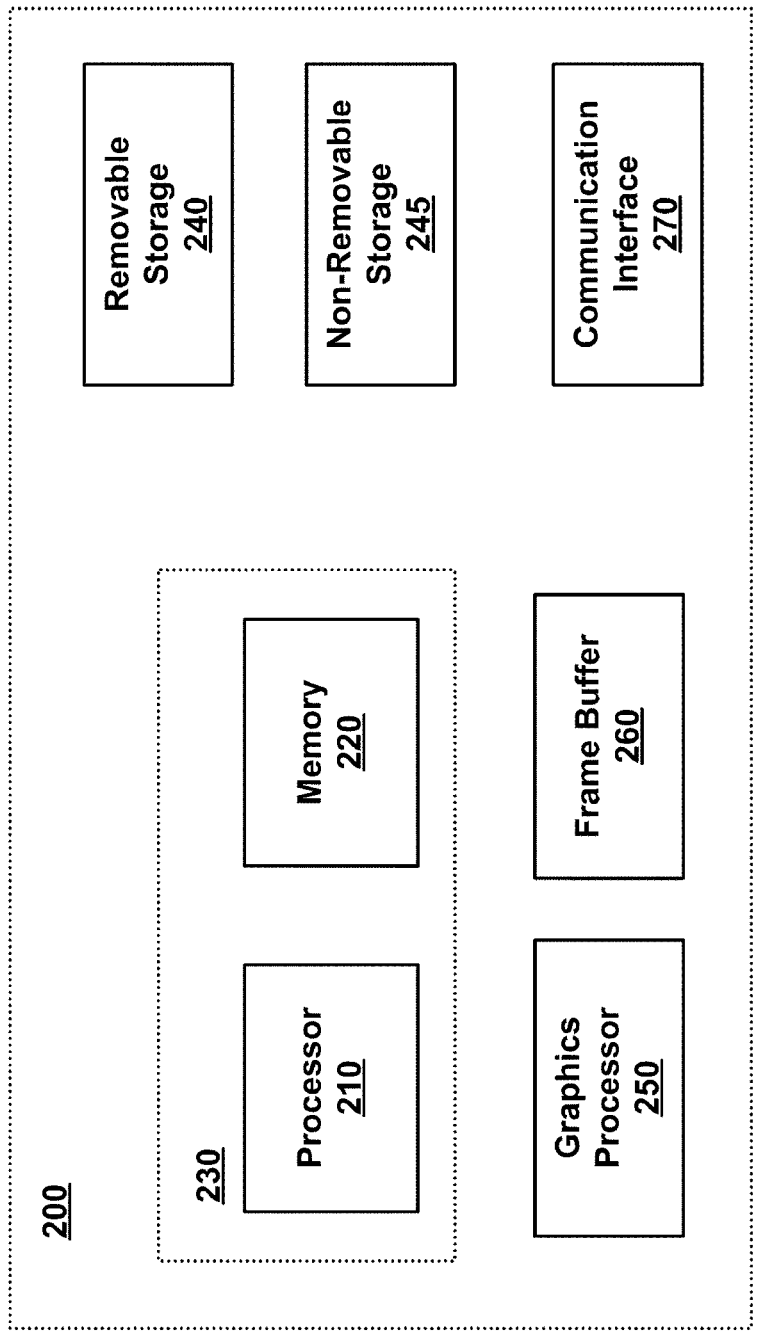
FIG. 2 shows an exemplary computer system platform upon which embodiments of the present invention may be implemented.

FIG. 2 shows exemplary computer system platform 200 upon which embodiments of the present invention may be implemented. As shown in FIG. 2, portions of the present invention are comprised of computer-readable and computer-executable instructions that reside, for example, in computer system platform 200 and which may be used as a part of a general purpose computer network (not shown). It is appreciated that computer system platform 200 of FIG. 2 is merely exemplary. As such, the present invention can operate within a number of different systems including, but not limited to, general-purpose computer systems, embedded computer systems, laptop computer systems, hand-held computer systems, portable computer systems, stand-alone computer systems, or game consoles.

In one embodiment, depicted by dashed lines 230, computer system platform 200 may comprise at least one processor 210 and at least one memory 220. Processor 210 may comprise a central processing unit (CPU) or other type of processor. Depending on the configuration and/or type of computer system environment, memory 220 may comprise volatile memory (e.g., RAM), non-volatile memory (e.g., ROM, flash memory, etc.), or some combination of the two. Additionally, memory 220 may be removable, non-removable, etc.

In other embodiments, computer system platform 200 may comprise additional storage (e.g., removable storage 240, non-removable storage 245, etc.). Removable storage 240 and/or non-removable storage 245 may comprise volatile memory, non-volatile memory, or any combination thereof. Additionally, removable storage 240 and/or non-removable storage 245 may comprise CD-ROM, digital versatile disks (DVD) or other optical storage, magnetic cassettes, magnetic tape, magnetic disk storage or other magnetic storage devices, or any other medium which can be used to store information for access by computer system platform 200.

As shown in FIG. 2, computer system platform 200 may communicate with other systems, components, or devices via communication interface 270. Communication interface 270 may embody computer readable instructions, data structures, program modules or other data in a modulated data signal (e.g., a carrier wave) or other transport mechanism. By way of example, and not limitation, communication interface 270 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 270 may also couple computer system platform 200 to one or more input devices (e.g., a keyboard, mouse, pen, voice input device, touch input device, etc.) and/or output devices (e.g., a display, speaker, printer, etc.).

As shown in FIG. 2, graphics processor 250 may perform graphics processing operations on graphical data stored in frame buffer 260 or another memory (e.g., 220, 240, 245, etc.) of computer system platform 200. Graphical data stored in frame buffer 260 may be accessed, processed, and/or modified by components (e.g., graphics processor 250, processor 210, etc.) of computer system platform 200 and/or components of other systems/devices. Additionally, the graphical data may be accessed (e.g., by graphics processor 250) and displayed on an output device coupled to computer system platform 200.

In one embodiment, computer system platform 200 may be used to implement computer system 110*a*, computer system 110*b*, computer system 110*c*, interface component 120, or some combination thereof. For example, communication interface 270 may communicatively couple computer system 200 to one or more other computer systems (e.g., 110*a*, 110*b*, 110*c*, etc. via interface 120). Additionally, memory 220, removable storage 240, non-removable storage 245, frame buffer 260, or a combination thereof, may comprise instructions that when executed on a processor (e.g., 210, 250, etc.) perform a method of implementing an interactive educational tool (e.g., using GUI 130, GUI 150, etc.), implementing a remote observation and evaluation interface (e.g., using GUI 130, GUI 150, etc.), implementing electronic flashcards (e.g., using GUI 130, GUI 150, etc.), or some combination thereof. The graphical data used to display the GUI (e.g., 130, 150, etc.) may be accessed from frame buffer 260 and displayed on an output device coupled to computer system platform 200.

Interactive Educational Tool

Figure 3:
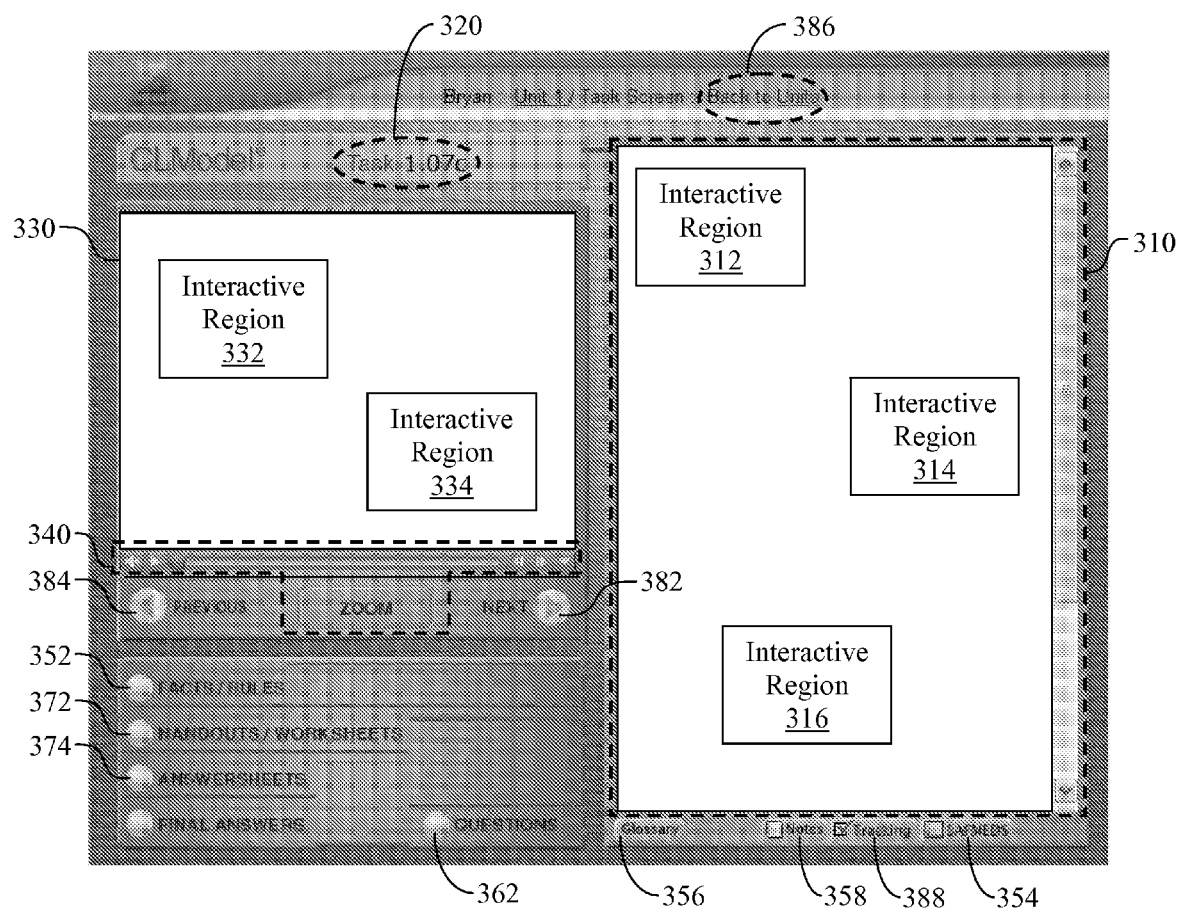
FIG. 3 shows an exemplary on-screen GUI for implementing an exemplary interactive educational tool in accordance with one embodiment of the present invention.

FIG. 3 shows exemplary on-screen GUI 300 for implementing an exemplary interactive educational tool in accordance with one embodiment of the present invention. As shown in FIG. 3, GUI 300 comprises window or region 310 for displaying text or other information about a predetermined subject matter. The text or other information displayed in region 310 may be related to a lesson plan or region of a lesson plan identified in region 320. Window or region 330 may present media (e.g., video, still images, etc.) related to the predetermined subject matter and/or the information presented in region 310. The media presented in region 330 may also be related to audio (e.g., an audio track for a video displayed in region 330, etc.) and/or other visual information (e.g., presented using GUI 300, presented by other light emitting devices, presented by other displays, etc.).

Accordingly, GUI 300 may be used to simultaneously present various forms of information (e.g., text in region 310 and video in region 330, etc.) related to a predetermined subject matter, thereby providing an educational tool which more conveniently and effectively presents educational information to users. For example, where GUI 300 is used to present information about or otherwise teach plumbing, region 320 may identify a unit associated with unclogging a drain, region 310 may present information about clogged drains (e.g., the cause of most clogs, the steps to be taken to unclog the drain, etc.), and region 330 may show a video of a plumber unclogging a drain. As such, learning may be enhanced using GUI 300 given the repetition of information in various forms (e.g., text in region 310 which may explain the steps of unclogging a drain, the video in region 330 which may show the performance of the steps explained in region 310, etc.), the simultaneous display of this information (e.g., enabling students to quickly and conveniently move from one form of information to another), and the ability for users to interact with this information using GUI 300 as discussed below.

As shown in FIG. 3, a user may interact (e.g., by moving an on-screen cursor over a region of GUI 300 and clicking a mouse button, by moving an on-screen cursor over a region of GUI 300, by pressing a touchscreen disposed over GUI 300, etc.) with various regions of GUI 300. For example, region 310 may comprise interactive regions 312-316 for enabling users to interact with text and/or other information presented in region 310. In one embodiment, regions 312-316 may comprise hyperlinked text for initiating display (e.g., within regions of GUI 300, in another displayed window, etc.) of additional content (e.g., related to the predetermined subject matter). Region 330 may comprise interactive regions 332 and 334 for enabling a user to interact with media presented in region 330.

Additionally, GUI 300 may comprise graphical objects 340 for enabling users to control and/or interact with media presented in region 330. For example, a user may play, stop, alter playback (e.g., fast forward, rewind, zoom, etc.), etc. media presented in region 330 by interacting with graphical objects 340. Additionally, a user may control the volume level (e.g., of the sound accompanying the media displayed in region 330) using one or more of graphical objects 340.

Figure 4:
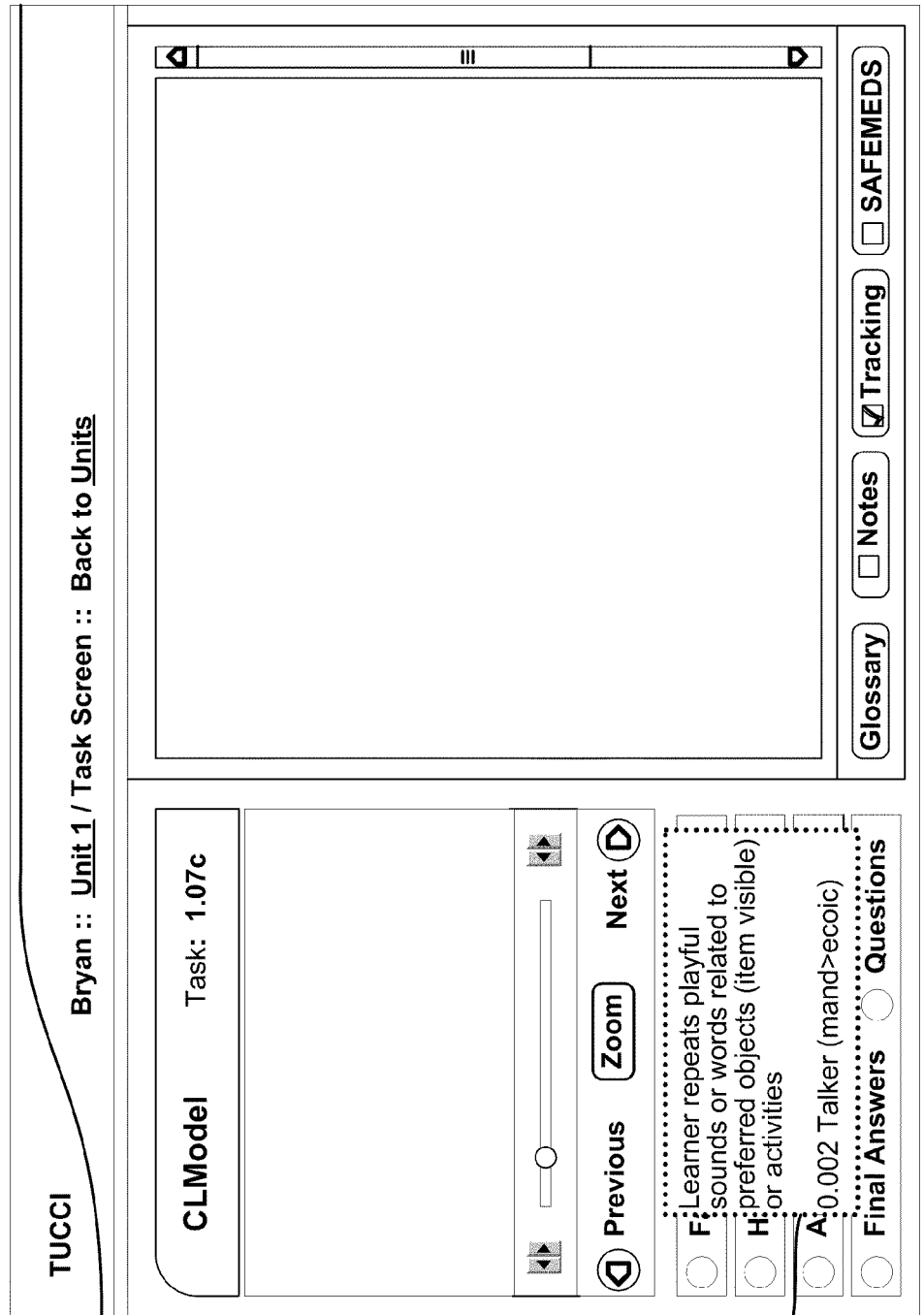
FIG. 4 shows display of exemplary information in response to interaction with a GUI in accordance with one embodiment of the present invention.

As shown in FIG. 3, interaction with graphical object 352 may initiate presentation of facts, rules, or similar information associated with the predetermined subject matter. For example, FIG. 4 shows display of exemplary information 410 in response to interaction with GUI 300 (e.g., graphical object 352) in accordance with one embodiment of the present invention. Information 410 may comprise an excerpt, paraphrase, summary, etc. of information presented in region 310 and/or region 330 of GUI 300. As such, embodiments enable presentation of information about the predetermined subject matter to users in yet another form, thereby improving learning and retention of the information. Additionally, presentation of information 410 enables users to repeat and/or study the information (e.g., comprising important points that the user may have previously overlooked) to further improve learning of the information.

Figure 5:
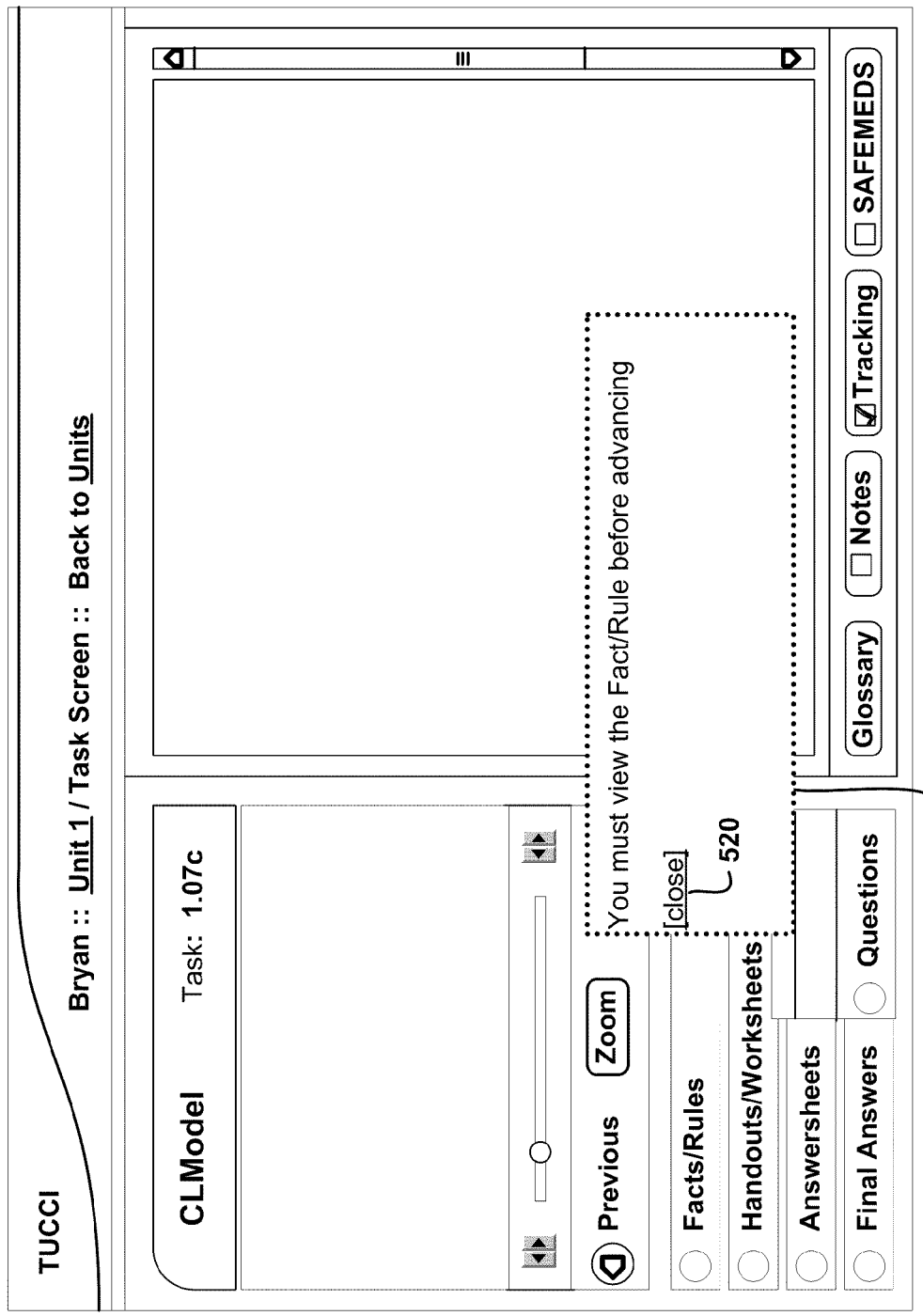
FIG. 5 shows an exemplary user prompt for encouraging interaction with a GUI and viewing of information in accordance with one embodiment of the present invention.

FIG. 5 shows exemplary user prompt 510 for encouraging interaction with GUI 300 and viewing of information 410 in accordance with one embodiment of the present invention. Graphical object 520 may be used to close or hide user prompt 510. In one embodiment, a user may be required to interact with graphical object 352 and view information 410 before the user will be allowed to progress in the lesson and learn new/different subject matter (e.g., presented in region 310, 330, etc.). As such, embodiments reduce the likelihood that a user will overlook or miss an important point (e.g., presented using information 410). Additionally, user prompt 510 may be displayed periodically as a user progresses through a lesson (e.g., each time an important point is presented using GUI 300), thereby increasing interaction with GUI 300 and improving learning of the predetermined subject matter presented using GUI 300.

Turning back to FIG. 3, interaction with graphical object 372 may initiate display of handouts, worksheets, or the like, associated with the predetermined subject matter. In one embodiment where a still image (e.g., a chart, table, etc.) is displayed in region 330, graphical object 372 may initiate the display of the still image in a larger form (e.g., in a separate window, etc.) for easier viewing and/or enable printing of the image. Alternatively, graphical object 372 may initiate display of a list of worksheets for a unit, task, lesson, etc., thereby enabling a user to select, view, print, etc. materials associated with the predetermined subject matter.

Interaction with graphical object 374 may initiate display of answer sheets associated with the predetermined subject matter. For example, where questions are presented in region 310 and/or region 330, graphical object 374 may initiate display of answers to those questions. In this manner, a user may periodically test and/or check his or her knowledge of the presented subject matter to further reinforce and reiterate the material. As such, embodiments provide further mechanisms for improving learning of the predetermined subject matter (e.g., presented using GUI 300 and/or other related GUIs).

Figure 21:
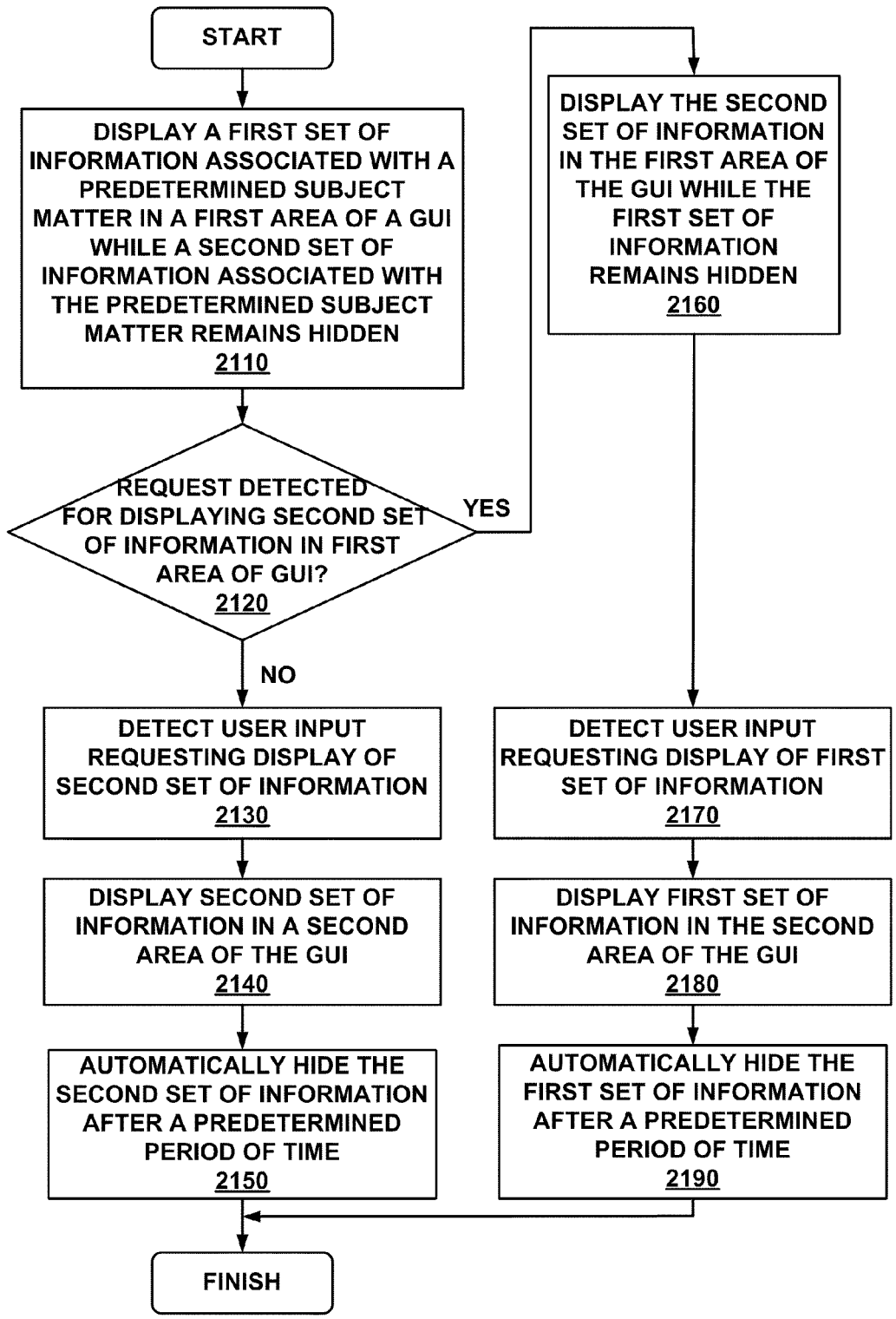
FIG. 21 shows an exemplary computer-implemented process for implementing electronic flashcards in accordance with one embodiment of the present invention.

As shown in FIG. 3, Interaction with graphical object 354 may initiate presentation of a GUI which implements electronic flashcards associated with the predetermined subject matter (e.g., as discussed with respect to FIGS. 21A-22). The electronic flashcards may enable the user to further learn and/or study information about the predetermined subject matter. In one embodiment, the electronic flashcards may comprise information 410, thereby enabling users to learn the information (e.g., presented in regions 310 and/or 330 of GUI 300) in yet another form.

Figure 6:
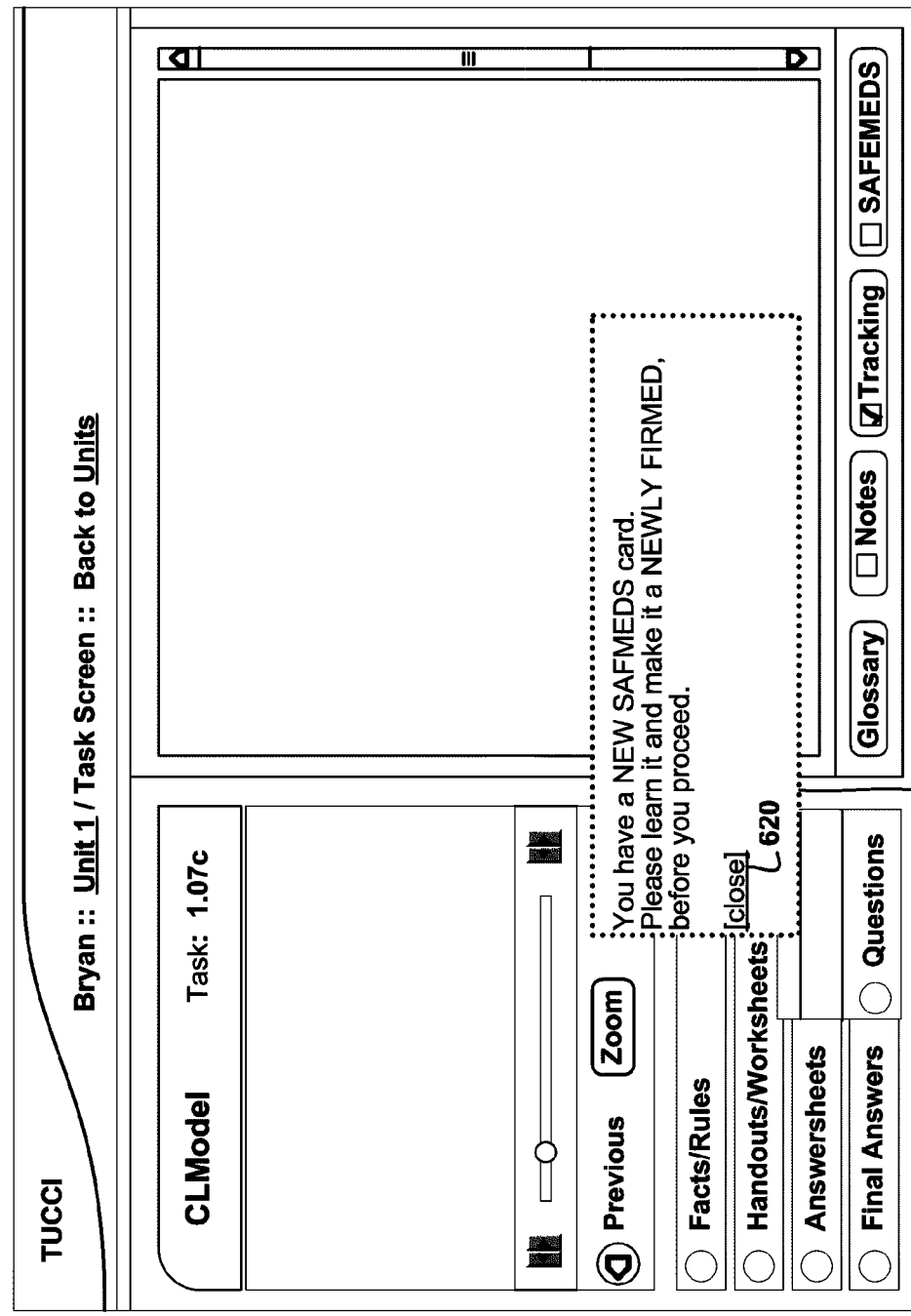
FIG. 6 shows an exemplary user prompt for encouraging interaction with a GUI and viewing of electronic flashcards in accordance with one embodiment of the present invention.

FIG. 6 shows exemplary user prompt 610 for encouraging interaction with GUI 300 and viewing of electronic flashcards in accordance with one embodiment of the present invention. Graphical object 620 may be used to close or hide user prompt 610. In one embodiment, a user may be required to interact with graphical object 354 and view electronic flashcards before the user will be allowed to progress in the lesson and learn new/different subject matter (e.g., presented in region 310, 330, etc.). As such, embodiments reduce the likelihood that a user will overlook or miss an important point (e.g., presented using a GUI for implementing the electronic flashcards). Additionally, user prompt 610 may be displayed periodically as a user progresses through a lesson (e.g., each time an important point is presented using GUI 300), thereby increasing interaction with GUI 300 and improving learning of the predetermined subject matter presented using GUI 300.

Turning back to FIG. 3, interaction with graphical object 356 may initiate presentation of a GUI which implements a glossary of terms associated with the predetermined subject matter. For example, FIG. 7 shows exemplary GUI 700 comprising a list of terms (e.g., in column 710) with respective definitions (e.g., in column 720) in accordance with one embodiment of the present invention. At least one respective keyword for each term is listed in column 730, while at least one respective task (e.g., unit number, lesson number, etc.) is listed in column 740. Information within GUI 700 may be sorted based upon column characteristic (e.g., in ascending order, descending order, etc.) by interacting with column headers in row 760 of GUI 700. Additionally, in one embodiment, the information within at least one of columns 710-740 may comprise the same or similar information as information 410 of FIG. 4, thereby improving learning by enabling users to quickly peruse the listing of important terms within GUI 700.

As shown in FIG. 7, a term and/or its corresponding information (e.g., definition, keywords, task, etc.) may be selected and viewed by interacting with the graphical object in column 750 corresponding to the row comprising the selected term and/or corresponding information. In one embodiment, the term and/or its corresponding information may be displayed in a separate window from GUI 700. Alternatively, the term and/or its corresponding information may be displayed within GUI 700 (e.g., by hiding all rows except for the row with the selected term, by graying out information in rows with non-selected terms, etc.).

Additionally, information within GUI 700 may be searched by interacting with graphical object 770. In one embodiment, graphical object 770 may bring up a separate GUI or window enabling a user to specify a search criteria for the search. The search criteria may comprise one or more terms within one or more of columns 710-740. Additionally, the GUI for specifying the search criteria may comprise one or more graphical objects for initiating the search and causing the search results to be displayed (e.g., within GUI 700). Where a search (e.g., initiated using graphical object 770) limits the displayed information within GUI 700 (e.g., to only the rows of information in GUI 700 meeting the search criteria), graphical object 780 may reset the display of information within GUI 700 to an initial state (e.g., originally displayed in response to interaction with graphical object 356 of FIG. 3), to a state preceding the search (e.g., initiated using graphical object 770), etc. Further, information within GUI 700 may be printed by interacting with graphical object 790.

Figure 8A:
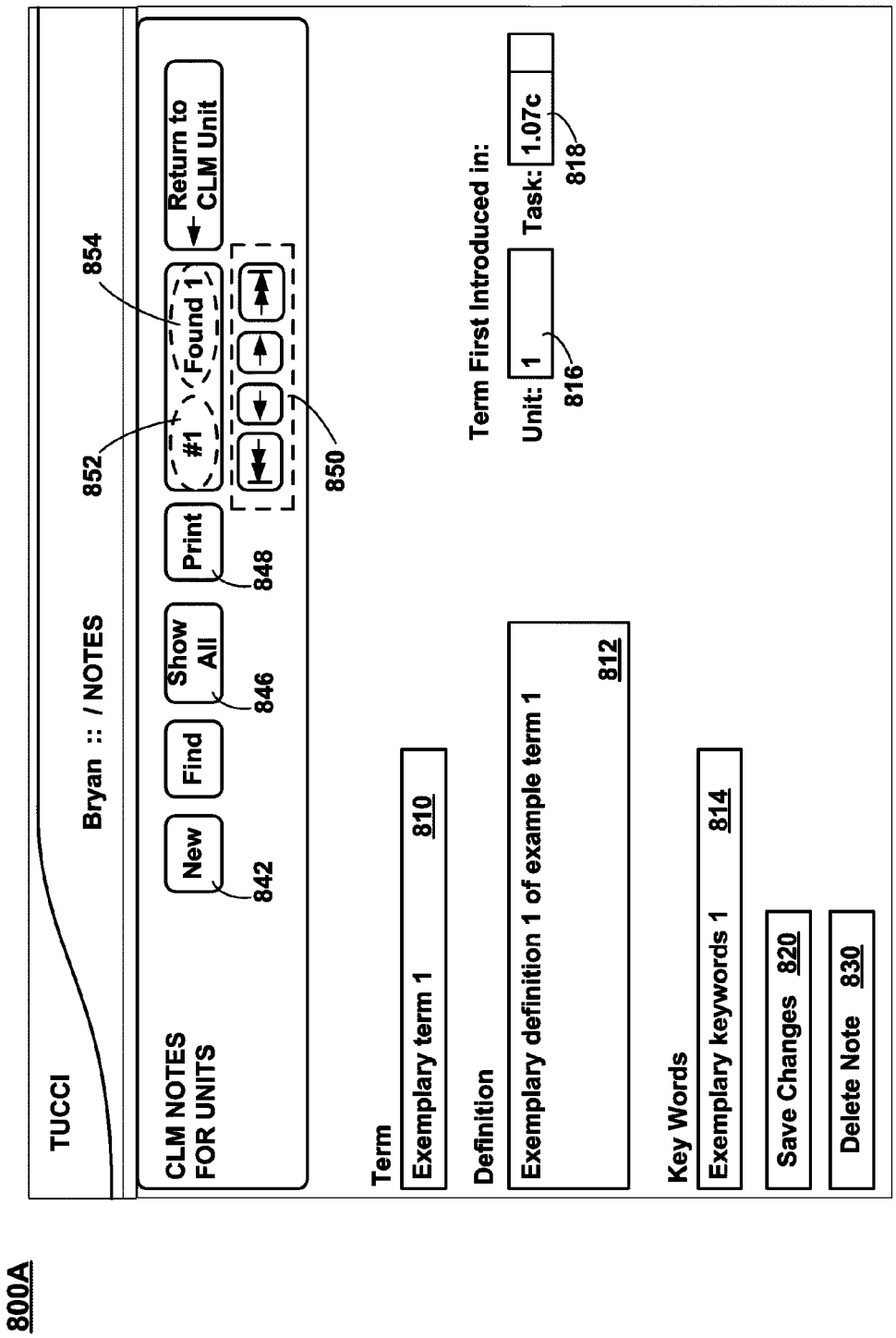
FIG. 8A shows an exemplary GUI for enabling users to enter and save notes in accordance with one embodiment of the present invention.

Turning back to FIG. 3, interaction with graphical object 358 may initiate presentation of a GUI which implements a note-taking tool. For example, FIG. 8A shows exemplary GUI 800A for enabling users to enter and save notes in accordance with one embodiment of the present invention. In one embodiment, terms may be entered in user-modifiable field 810, definitions may be entered in user-modifiable field 812, keywords may be entered in user-modifiable field 814, a unit number may be entered in user-modifiable field 816, and a task may be entered in user-modifiable field 818. The entries in fields 810-818 and/or changes to the entries in fields 810-818 may be saved using graphical object 820. Additionally, GUI 800A comprises graphical object 830 for deleting a recalled note.

As shown in FIG. 8A, interaction with graphical object 842 may create a new note. In one embodiment, fields 810-818 may be cleared to enable a user to enter new information. Once graphical object 842 has been activated, subsequent interaction with graphical object 820 may save changes to the new note. Similarly, once graphical object 842 has been activated, subsequent interaction with graphical object 830 may delete the new note. Further, information within GUI 800A may be printed by interacting with graphical object 848.

Figure 8B:
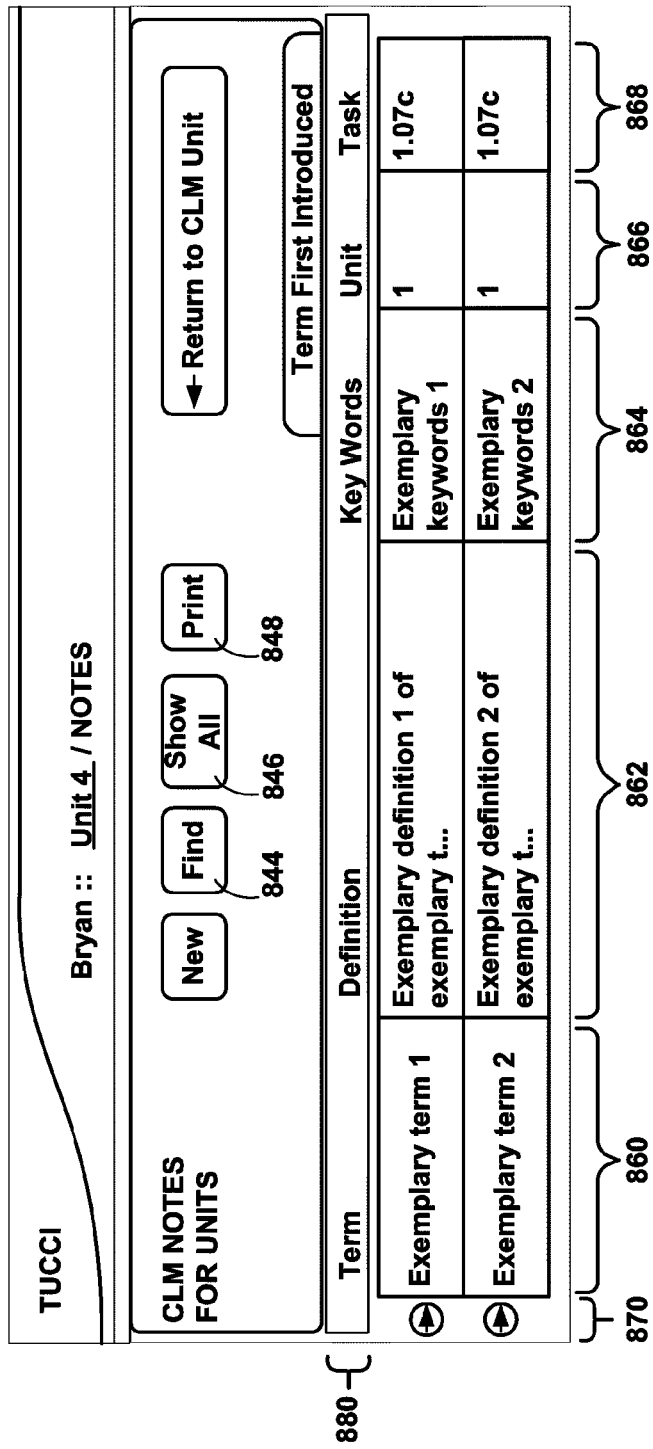
FIG. 8B shows several exemplary notes in accordance with one embodiment of the present invention.

Interaction with graphical object 846 may display a list of saved notes within GUI 800B of FIG. 8B. FIG. 8B shows several exemplary notes in accordance with one embodiment of the present invention, where each note comprises a term (e.g., within column 860), a respective definition (e.g., within column 862), at least one respective keyword (e.g., within column 864), a respective unit (e.g., within column 866), a respective task (e.g., within column 868), or some combination thereof. Information within GUI 800B may be sorted based upon column characteristic (e.g., in ascending order, descending order, etc.) by interacting with column headers in row 880 of GUI 800B.

As shown in FIG. 8B, a saved note may be selected and viewed by interacting with the graphical object in column 870 corresponding to the row comprising the selected note. In one embodiment, a term and/or it corresponding information (e.g., definition, keywords, unit, task, etc.) of the selected note may be displayed in a separate window from GUI 700. Alternatively, a term and/or its corresponding information of the selected note may be displayed within GUI 700 (e.g., by hiding all rows except for the row with the selected note, by graying out information in rows with non-selected notes, etc.).

Additionally, information within GUI 800B may be searched by interacting with graphical object 844. In one embodiment, graphical object 844 may bring up a separate GUI or window enabling a user to specify a search criteria for the search. The search criteria may comprise one or more terms within one or more of columns 860-868. Additionally, the GUI for specifying the search criteria may comprise one or more graphical objects for initiating the search and causing the search results to be displayed (e.g., within GUI 800B). Where a search (e.g., initiated using graphical object 844) limits the displayed information within GUI 800B (e.g., to only the rows of information in GUI 800B meeting the search criteria), graphical object 846 may reset the display of information within GUI 800B to the state preceding the search (e.g., initiated using graphical object 844). Further, information within GUI 800B may be printed by interacting with graphical object 848.

Turning back to FIG. 8A, interaction with graphical objects 850 may navigate or cycle through saved notes (e.g., all saved notes, a subset of saved notes determined by a search, etc.). Graphical object 852 may indicate a current note for which information is displayed (e.g., in GUI 800A). Additionally, graphical object 854 may indicate a number of saved notes through which graphical objects 850 may be used to navigate.

Figure 9A:
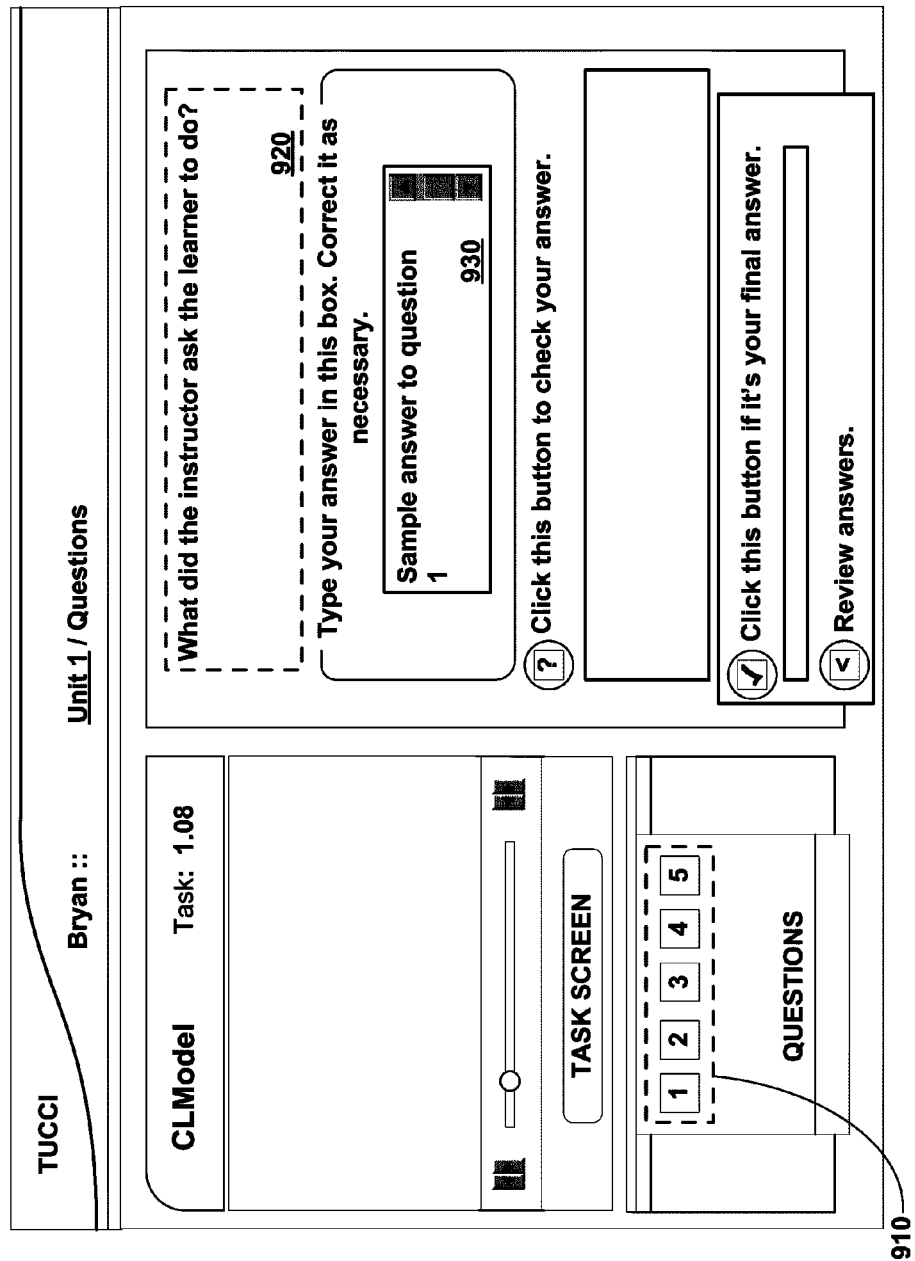
FIG. 9A shows an exemplary GUI for entering answers to questions in accordance with one embodiment of the present invention.

Turning back to FIG. 3, interaction with graphical object 362 may initiate presentation of a GUI for entering answers to questions and comparing the entered answer with the correct answer. For example, FIG. 9A shows exemplary GUI 900 for entering answers to questions in accordance with one embodiment of the present invention. As shown in FIG. 9A, a question may be selected by interacting with graphical objects 910. The selected question may be displayed in region 920. Additionally, user-modifiable field 930 may accept a user-input response to the question.

Figure 9B:
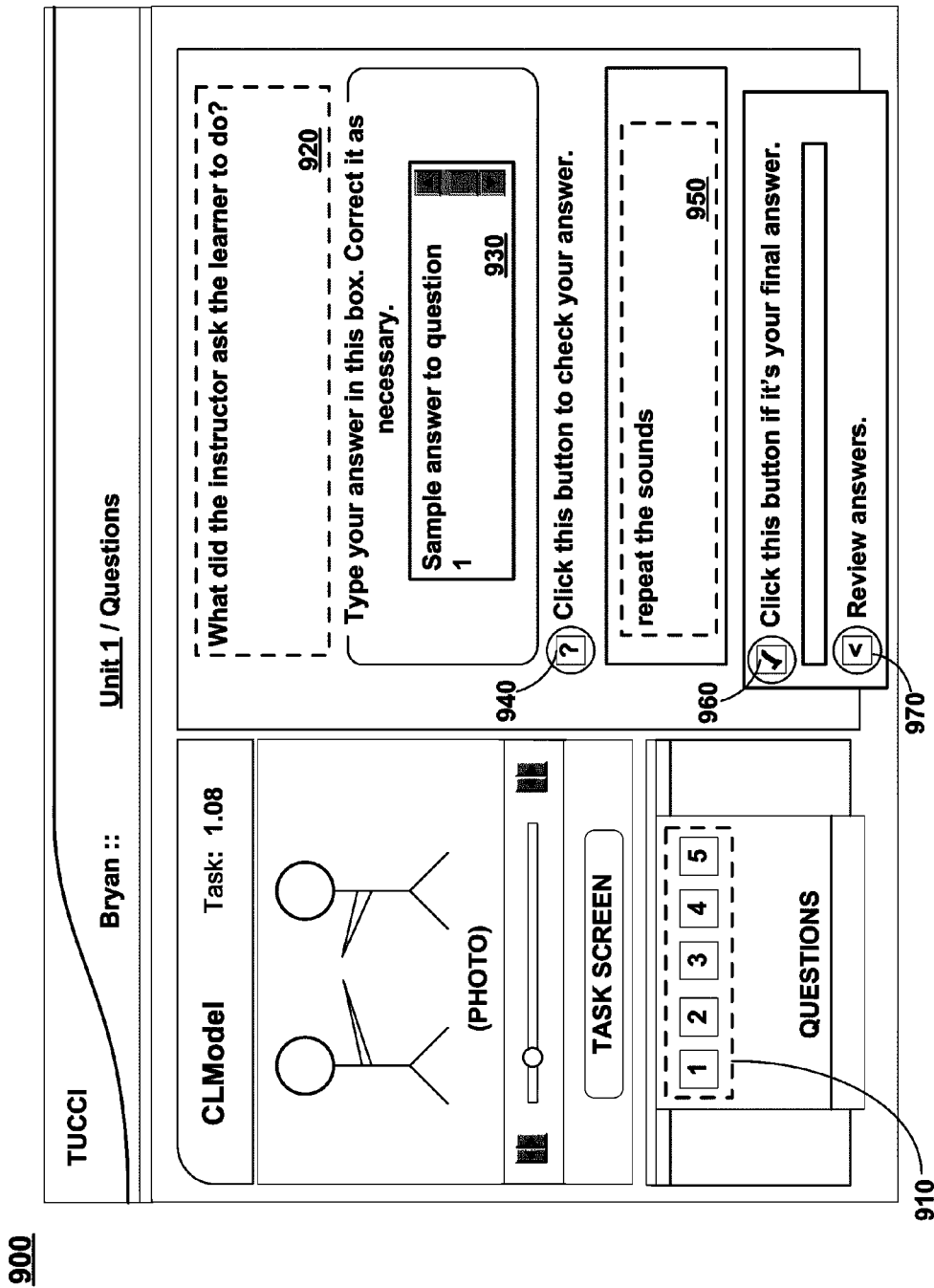
FIG. 9B show an exemplary GUI for comparing a user-input response with a predetermined answer in accordance with one embodiment of the present invention.

FIG. 9B show exemplary GUI 900 for comparing a user-input response with a predetermined answer in accordance with one embodiment of the present invention. As shown in FIG. 9B, interaction with graphical object 940 may initiate display of a predetermined answer (e.g., in region 950 of GUI 900) to the question (e.g., selected using graphical objects 910 and displayed in region 920), where the predetermined answer may remain hidden until graphical object 940 is activated. The predetermined answer may remain visible in region 950 for a predetermined period of time until it automatically returns to the hidden state. Alternatively, the predetermined answer may remain visible until a user input (e.g., via graphical object 940, another graphical object of GUI 900, etc.) is detected requesting that the predetermined answer be hidden. Accordingly, the user-input response entered in field 930 may be compared with the predetermined answer, thereby improving learning by encouraging the user to review the predetermined subject matter, find the correct answer, think about why the user-input response may not match the predetermined answer, etc.

Interaction with graphical object 960 may save the user-input response in field 930. In one embodiment, graphical object 960 may indicate a final answer to the question presented in region 920. Additionally, interaction with graphical object 970 may initiate display of a GUI which displays saved answers.

Figure 10:
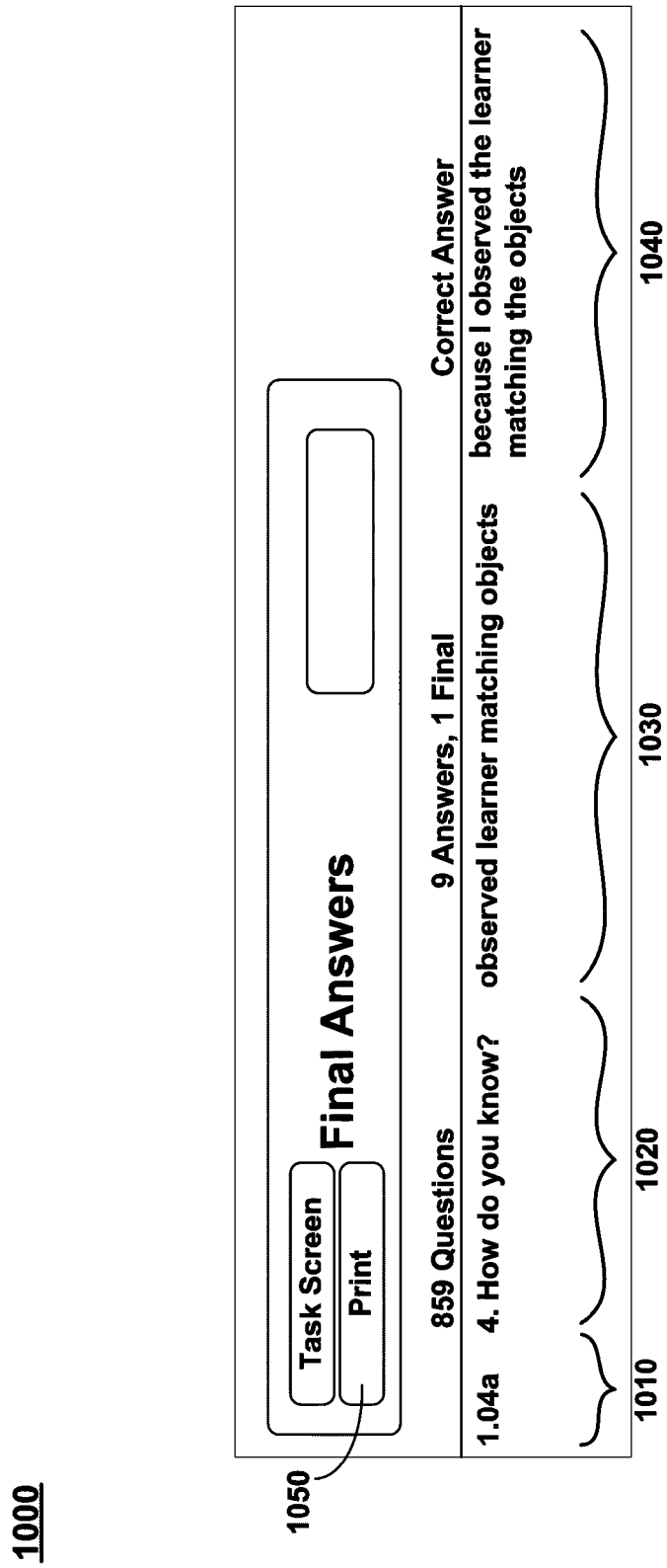
FIG. 10 shows an exemplary GUI for displaying saved answers in accordance with one embodiment of the present invention.

FIG. 10 shows exemplary GUI 1000 for displaying saved answers in accordance with one embodiment of the present invention. The answers displayed in GUI 1000 may be those entered into field 930 of GUI 900 and saved by interacting with graphical object 970 of GUI 900. As shown in FIG. 10, column 1010 may comprise a task number related to the answer, column 1020 may comprise the question (e.g., displayed in region 920 of GUI 900), column 1030 may comprise a user-input response (e.g., entered into field 930 of GUI 900) to the question, and column 1040 may comprise a predetermined answer (e.g., displayed in region 950 of GUI 900 as shown in FIG. 9B) to the question. As such, users can easily and quickly review their responses and compare them to the correct or predetermined answers. Further, interaction with graphical object 1050 may initiate printing of the information in GUI 1000 (e.g., to enable users to study and review a hardcopy of the information).

In one embodiment, user-input responses (e.g., shown in column 1030 of GUI 1000) may be accessed by another person and/or computer system for analyzing the student's performance, determining if a student is taking the lesson seriously, latency of the responses from a user, error analysis, or the like. For example, where GUI 130 of computer system 110a is used to implement GUI 900 and/or GUI 1000, the information may be stored locally on computer system 100a for subsequent analysis (e.g., automatically by a program run on computer system 110a, by a professor or other person using computer system 110a after the user, etc.), exported to another computer system for remote analysis (e.g., automatically by a program run on computer system 110b and/or 110c, by a professor or other person using computer system 110b and/or 110c, etc.).

Turning back to FIG. 3, interaction with graphical object 382 may advance the lesson (e.g., advance to a new task, new unit, etc.) and present new information (e.g., using GUI 300, another GUI, etc.) related to the predetermined subject matter. Graphical object 384 may return to previously-accessed subject matter. Additionally, interaction with graphical object 386 may initiate display of a GUI for selecting a unit or task (e.g., to present using GUI 300).

Figure 11:
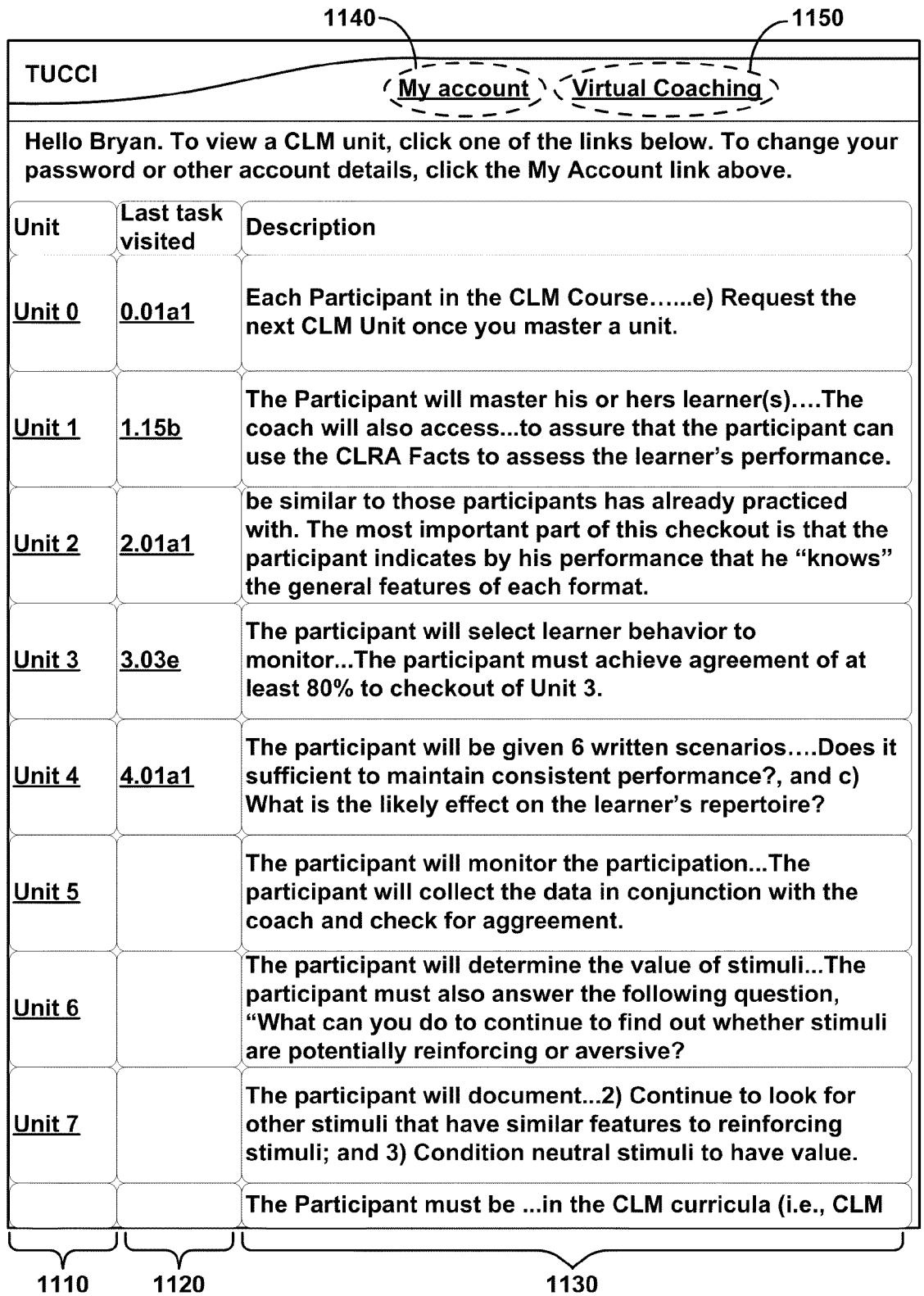
FIG. 11 shows an exemplary GUI for selecting a unit or task in accordance with one embodiment of the present invention.

FIG. 11 shows exemplary GUI 1100 for selecting a unit or task in accordance with one embodiment of the present invention. As shown in FIG. 11, column 1110 lists units, column 1120 lists the last task accessed (e.g., using GUI 300 of FIG. 3), and column 1130 provides an exemplary description of each unit. In one embodiment, some or all of the information in columns 1110-1130 may be interactive such that users may initiate display of information (e.g., using GUI 300 of FIG. 3) related to the information interacted with. For example, if a user interacts with "Unit 4" in column 1110, then GUI 300 may be displayed to present information about the fourth unit. As another example, if a user interacts with "4.01a1" in column 1120, then GUI 300 may be displayed to present information about task 4.01a1.

GUI 1100 may also comprise graphical object 1140 for initiating display of a GUI for entering or changing account information (e.g., username, password, personal details, etc.). Interaction with graphical object 1150 may initiate display of a GUI for enabling observation and/or evaluation of a student by a professor (e.g., as discussed below with respect to FIGS. 15-20).

Figure 12:
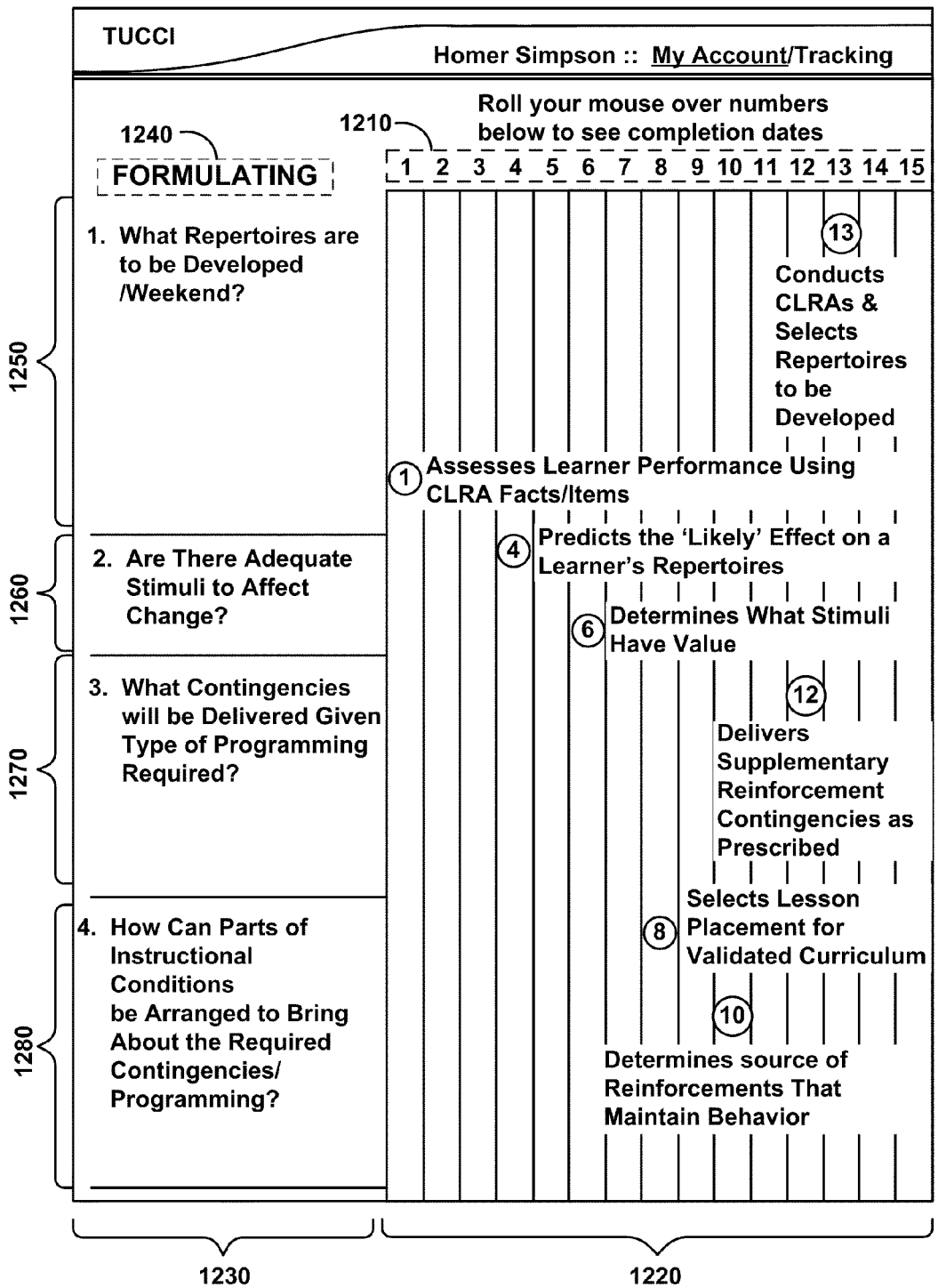
FIG. 12 shows an exemplary GUI for tracking student progress in accordance with one embodiment of the present invention.
Figure 12:
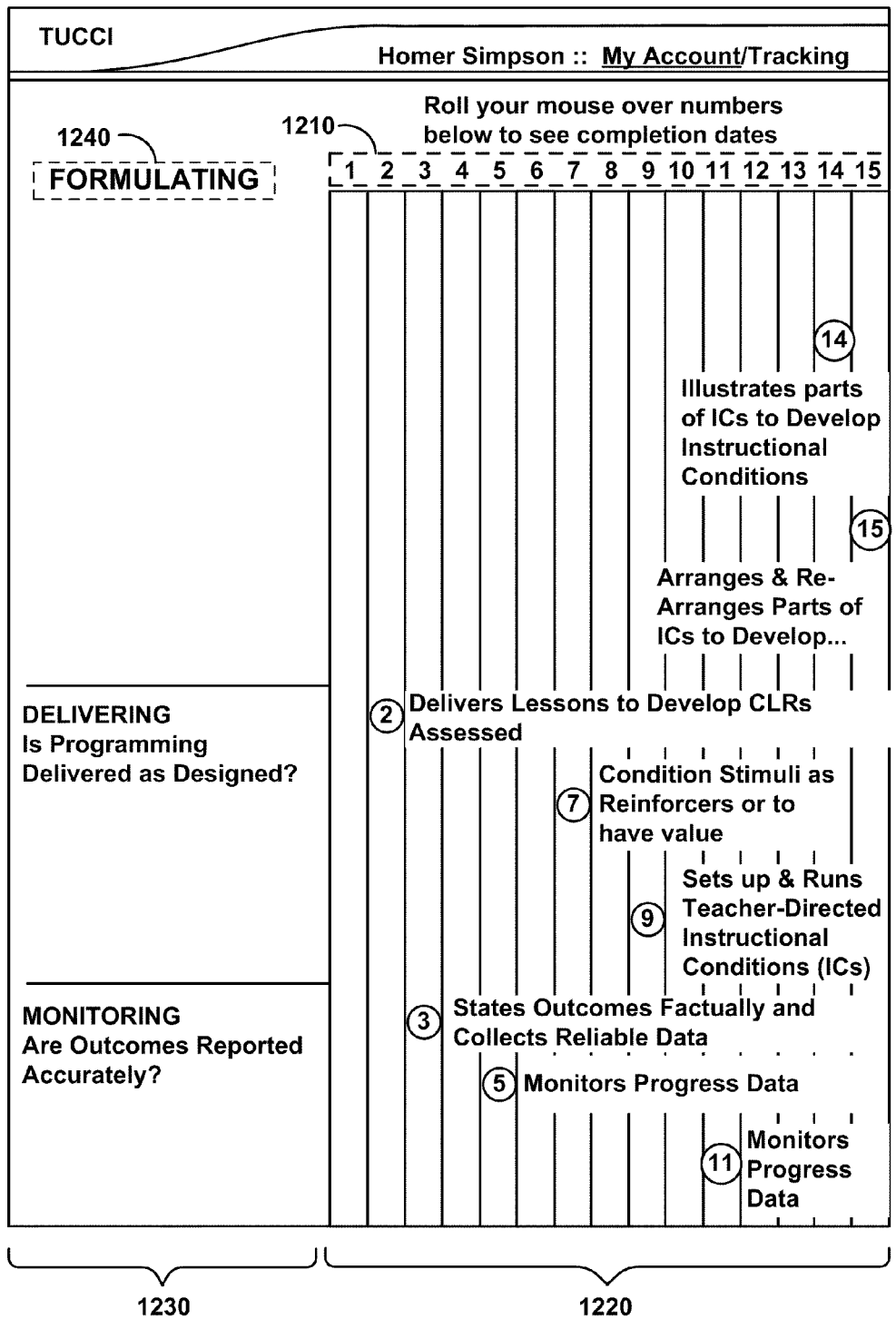

Turning back to FIG. 3, interaction with graphical object 388 may initiate display of a GUI for tracking student progress. FIG. 12 shows exemplary GUI 1200 for tracking student progress in accordance with one embodiment of the present invention. As shown in FIG. 12, interaction with graphical objects 1210 may initiate display (e.g., within a region of GUI 1200, within a separate window or GUI, etc.) of information (e.g., amount of the unit or lesson completed, completion date if completed, etc.) about the student's progress through the lesson. For example, if a user positions an on-screen cursor over the number "5" of graphical objects 1210, then information about the student's progress through unit 5 (e.g., a completion date for unit 5) may be displayed.

As shown in FIG. 12, region 1220 of GUI 1200 may comprise unit numbers and descriptions of each unit. In one embodiment, the descriptions of the units in region 1220 may match the descriptions in column 1130 of FIG. 11. In other embodiments, the information in region 1220 may comprise a summary or title for each unit.

Region 1230 comprises headings and subheadings for grouping the listing of units (e.g., represented by graphical objects 1210 and the numbers within region 1220). For example, heading 1240 has four subheadings 1250-1280. Subheading 1250 comprises unit 13, unit 1, and unit 4. As such, GUI 1200 provides a listing of units as well as grouping and/or characterization of the units (e.g., represented by headings and/or subheadings within column 1230) to provide additional information (e.g., contextual information for a selected unit with respect to other units) about the predetermined subject matter.

Figure 13:
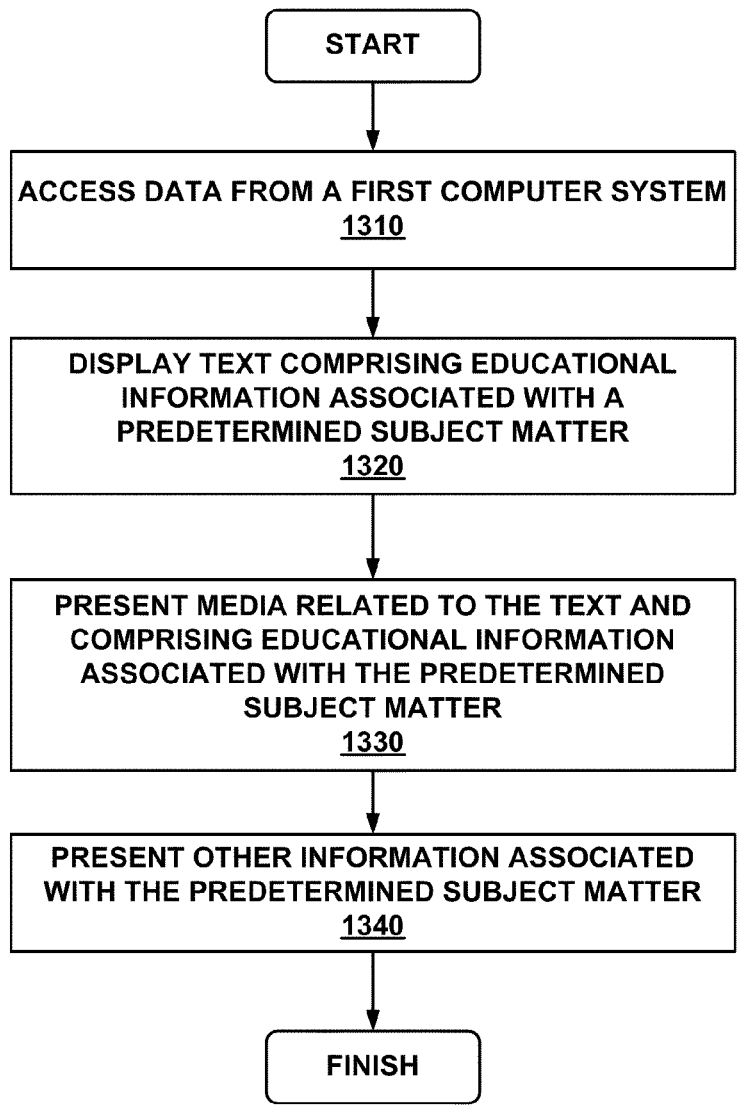
FIG. 13 shows an exemplary computer-implemented process for implementing an interactive education tool in accordance with one embodiment of the present invention.

FIG. 13 shows exemplary computer-implemented process 1300 for implementing an interactive education tool in accordance with one embodiment of the present invention. As shown in FIG. 13, step 1310 involves accessing data (e.g., 140 of FIG. 1) from a first computer system (e.g., 110b of FIG. 1). The first computer system (e.g., 110b) may be communicatively coupled to an interface (e.g., 120 of FIG. 1), and the data (e.g., 140) may be accessed using that interface (e.g., 120).

Step 1320 involves displaying text comprising educational information associated with a predetermined subject matter. The text may be generated from the data (e.g., 140) accessed in step 1310. Additionally, the text may be displayed (e.g., using GUI 130 of FIG. 1, in region 310 of GUI 300 of FIG. 3, etc.) on a second computer system (e.g., 110a of FIG. 1) located remotely from the first computer system.

As shown in FIG. 13, step 1330 involves presenting media related to the text (e.g., displayed in step 1320) and comprising educational information associated with the predetermined subject matter. The media may be generated from the data (e.g., 140) accessed in step 1310. Additionally, the media may be presented (e.g., using GUI 130 of FIG. 1, in region 330 of GUI 300 of FIG. 3, etc.) on a second computer system (e.g., 110a of FIG. 1) located remotely from the first computer system. Further, the media may be presented simultaneously with the display of the text in step 1320 in one embodiment.

The media may comprise video, still images, sound, etc. Additionally, the media may visually depict the predetermined subject matter associated with the text. For example, where the predetermined subject matter is plumbing related to drain unclogging, the text (e.g., displayed in step 1320) may explain how to unclog a drain and the media (e.g., presented in step 1330) may show a plumber unclogging a drain.

As shown in FIG. 13, step 1340 involves presenting other information associated with the predetermined subject matter. For example, the additional information presented in step 1340 may comprise a listing of answers to questions associated with the predetermined subject matter, user-input responses to questions associated with the predetermined subject matter, user-input notes associated with the predetermined subject matter, a glossary of terms used in the text, and educational worksheets associated with the predetermined subject matter.

Figure 14:
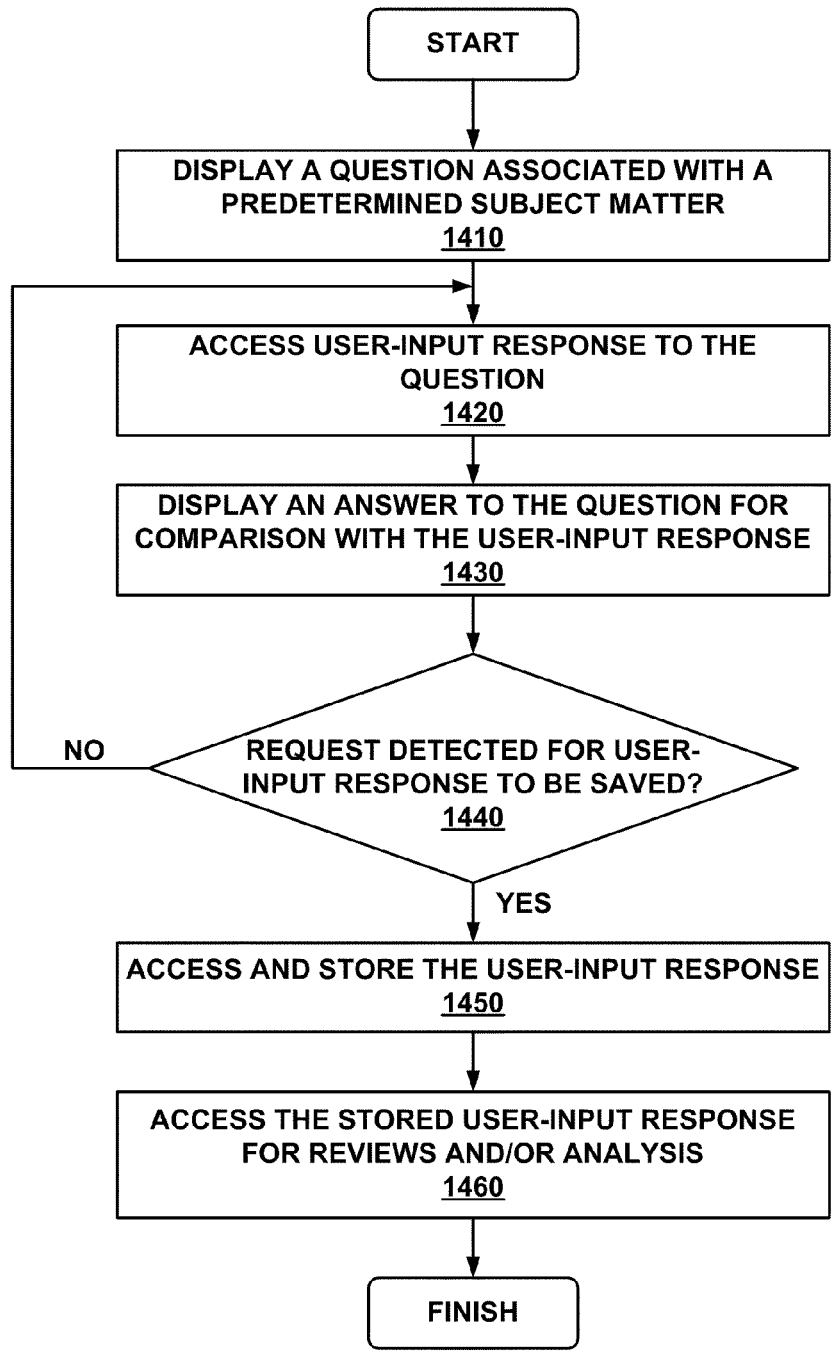
FIG. 14 shows an exemplary computer-implemented process for presenting questions and accepting user-input responses to the question in accordance with one embodiment of the present invention.

FIG. 14 shows exemplary computer-implemented process 1400 for presenting questions and accepting user-input responses to the question in accordance with one embodiment of the present invention. As shown in FIG. 14, step 1410 involves displaying a question associated with a predetermined subject matter. The question may be displayed (e.g., using GUI 130, in region 920 of GUI 900, etc.) using data (e.g., 140) accessed from a remote computer system (e.g., 110b).

Step 1420 involves accessing a user-input response (e.g., answer) to the question. The user-input response may be input to and/or displayed in a user-modifiable field (e.g., 930) of a GUI (e.g., 900).

As shown in FIG. 14, step 1430 involves displaying an answer to the question for comparison with the user-input response. The answer may be displayed (e.g., in region 950 of GUI 900) in response to a user input (e.g., an interaction with graphical object 940 of GUI 900). Additionally, the answer may remain hidden until it is displayed in step 1430. The answer may remain visible for a predetermined period of time after display in step 1430 until it automatically returns to the hidden state. Alternatively, the answer may remain visible until a user input (e.g., via graphical object 940, another graphical object of GUI 900, etc.) is detected requesting that the predetermined answer be hidden. Accordingly, the user-input response (e.g., accessed in step 1420) may be compared with the predetermined answer (e.g., displayed in step 1430), thereby improving learning by encouraging the user to review the predetermined subject matter, find the correct answer, think about why the user-input response may not match the predetermined answer, etc.

Step 1440 involves determining whether a request was detected for the user-input response (e.g., accessed in step 1420) to be saved (e.g., by interacting with graphical object 960). If it is determined that a request was not detected for the user-input response to be saved, then steps 1420-1440 may be repeated. Alternatively, if it is determined that a request was detected for the user-input response to be saved, then the user-input response may be accessed and stored (e.g., in a memory of the computer system presenting the GUI for displaying the question, in a memory of a remote computer system, etc.) in step 1450.

As shown in FIG. 14, step 1460 involves accessing the stored user-input response for review and/or analysis. The stored user-input response may be displayed (e.g., in GUI 1000 for review by a user, on a remote system for review by a professor or an individual performing student analysis, etc.). The stored user-input response may be accessed (e.g., by a local computer system, by a remote computer system, etc.) for automated analysis of the student's performance in another embodiment.

Remote Observation and Evaluation Interface

FIG. 15 shows exemplary GUI 1500 for listing coaches or professors in accordance with one embodiment of the present invention. As shown in FIG. 15, region 1510 of GUI 1500 comprises a listing of coaches or professors, information (e.g., area of expertise, years in a given industry, etc.) about one or more of the coaches or professors, and times when the coach or professor is available to observe and/or evaluate a student. For example, "Coach 1" specializes in plumbing, has been a plumber for over 15 years, and is available on Tuesdays and Thursdays for observation and/or evaluation sessions with students. Additionally, GUI 1500 comprises graphical objects 1520 for requesting sessions with a coach or professor (e.g., listed in region 1510). In one embodiment, interaction with one of graphical objects 1520 may initiate display of a GUI for enabling a student to request a session with a coach or professor (e.g., corresponding to the activated one of graphical objects 1520). Additionally, interaction with graphical object 1530 may initiate display of a forum GUI for enabling users (e.g., students, coaches or professors, etc.) to share information, exchange content (e.g., videos, pictures, etc.), etc.

FIG. 16 shows exemplary GUI 1600 for enabling a student to request a session with a coach or professor in accordance with one embodiment of the present invention. As shown in FIG. 16, region 1610 of GUI 1600 comprises information about the availability of coach or professor to aid the student in requesting a session. For example, "Coach 1" is available from 11 am to 3 pm on Tuesday, and from 2 pm to 5 pm on Thursday. Region 1620 comprises a plurality of user-modifiable fields for requesting a day and/or time for a session with a coach or professor. Further, students can enter or suggest multiple days/times for the session in order of preference. Additionally, region 1630 comprises a user-modifiable field for entering a message (e.g., to accompany the session request to the coach or professor). Further, interaction with graphical object 1640 may send the requested time and/or message to the coach or professor.

FIG. 17 shows exemplary GUI 1700 for enabling a coach or professor to view students and setup a session with a student in accordance with one embodiment of the present invention. As shown in FIG. 17, GUI 1700 comprises a list of students (e.g., in column 1710), a respective highest unit number to which each student has access (e.g., in column 1720), and respective minutes of credit remaining (e.g., in column 1730) for use toward observation and/or evaluation sessions with a coach or professor. Additionally, column 1740 comprises a plurality of respective graphical objects corresponding to each student and for enabling a coach or professor to initiate a session with a student. For example, interaction with a graphical object in column 1740 may initiate display of a GUI for enabling the coach or professor to observe and/or evaluate the student.

Figure 18A:
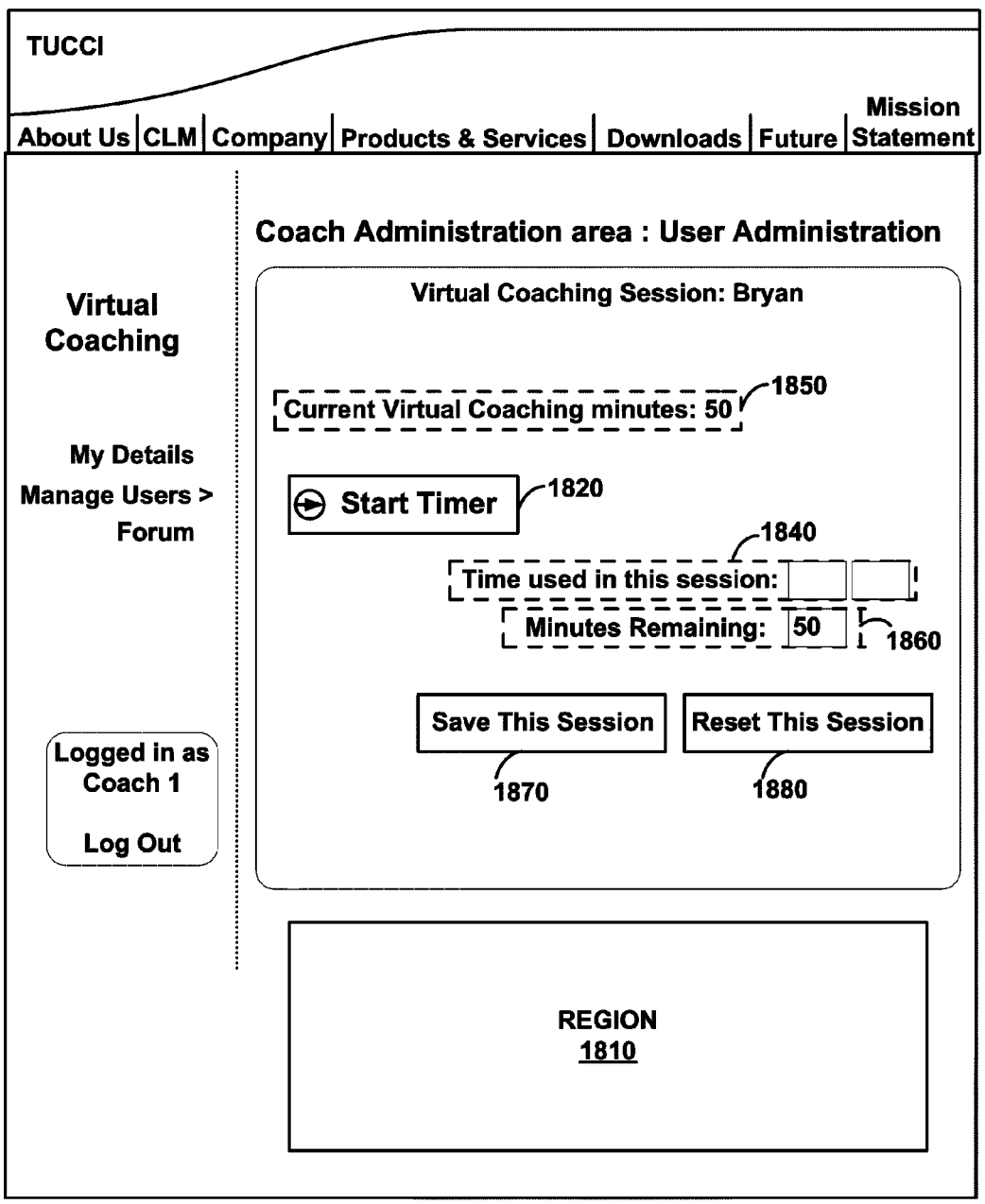
FIG. 18A shows an exemplary GUI for initiating an observation and/or evaluation session with a student in accordance with one embodiment of the present invention.
Figure 18B:
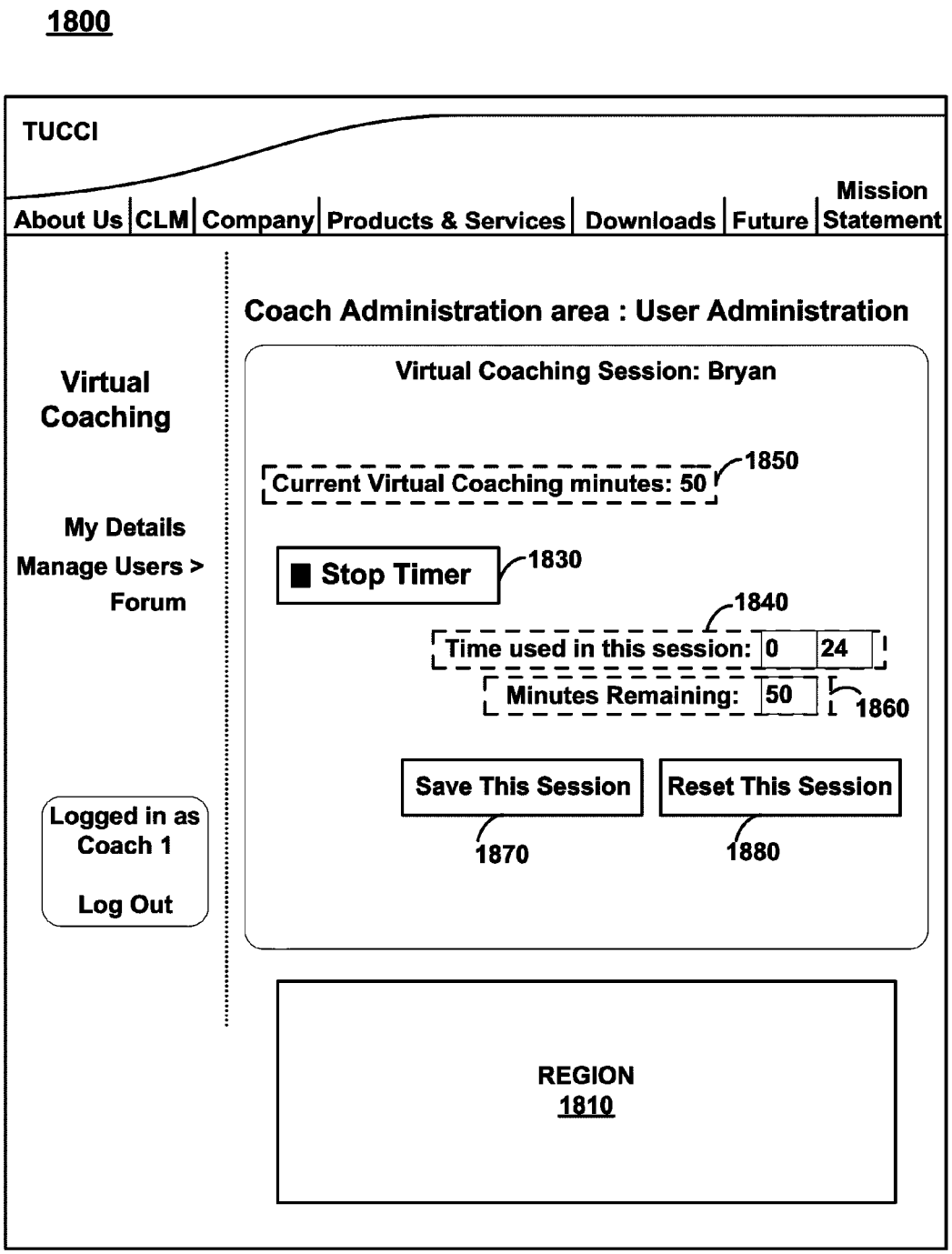
FIG. 18B shows an exemplary GUI for terminating an observation and/or evaluation session with a student in accordance with one embodiment of the present invention.

FIG. 18A shows exemplary GUI 1800 for initiating an observation and/or evaluation session with a student in accordance with one embodiment of the present invention, whereas FIG. 18B shows exemplary GUI 1800 for terminating an observation and/or evaluation session with a student in accordance with one embodiment of the present invention. As shown in FIG. 18A, GUI 1800 comprises region 1810 for presenting media (e.g., video, still images, etc.). In one embodiment, video of a student performing an action or task related to a predetermined subject matter (e.g., taught using an interactive educational tool implemented using GUI 300) may be displayed in region 1810. Audio related to the video presented in region 1810 may be played simultaneously with the video to implement an audio/visual presentation. The media presented using regions of GUI 1800 (e.g., region 1810) may be pre-recorded, streamed, live, etc. Accordingly, a coach or professor may observe and/or evaluate the student's performance using GUI 1800.

Video displayed in region 1810 may be generated using a video and/or audio conferencing software such as Skype™, IChat from Apple Inc. of Cupertino, Calif., or the like. As such, a student may use a camera (e.g., web camera, etc.) coupled to a computer system (e.g., 110c of FIG. 1) to record or otherwise capture an action or performance. The video data of the performance may be accessed by a computer system (e.g., 110a) of a coach or professor and used to present the student's performance to the coach or professor (e.g., in region 1810 of GUI 1800). Thus, a coach or professor may observe and/or evaluate the student's performance using video (e.g., presented using GUI 1800) and/or audio (e.g., associated with the video presented in region 1810 of GUI 1800, presented simultaneously with the display of GUI 1800, etc.).

GUI 1800 may also provide the ability to record the duration of an observation and/or evaluation session. For example, a coach or professor may interact with graphical object 1820 (e.g., shown in FIG. 18A) to start a timer (e.g., displayed in region 1840 of GUI 1800 showing an elapsed time of the session). The timer may be stopped by interacting with graphical object 1830 (e.g., shown in FIG. 18B). In one embodiment, the timer may be started when the student begins a performance, and may be stopped when the student completes the performance. Additionally, it should be appreciated that graphical object 1820 and graphical object 1830 may be simultaneously displayed in GUI 1800 in other embodiments.

Additionally, GUI 1800 may implement an automated billing system for the sessions conducted by the coach or professor. For example, a user or student may purchase a predetermined amount of time of observation/evaluation by a coach or professor. Region 1850 may indicate an amount of purchased time (e.g., displayed in column 1730 of FIG. 17) for use toward observation and/or evaluation by a coach. In one embodiment, region 1850 may display an amount of purchased time remaining before the current session was initiated (e.g., using graphical object 1820). Region 1860 may indicate the remaining time for use toward observation and/or evaluation by a coach, where the amount of time displayed in region 1860 may decrement as the elapsed time displayed in region 1840 increments. As such, GUI 1800 may enable the student to be automatically charged or billed (e.g., in response to interaction with graphical object 1870) for observation/evaluation time used (e.g., displayed in region 1840). Alternatively, interaction with graphical object 1880 may enable the session to be reset (e.g., to reset the timer displayed in region 1840 and the remaining minutes displayed in region 1860).

It should be appreciated that audio alone (e.g., associated with the video presented in region 1810 of GUI 1800, presented simultaneously with the display of GUI 1800, etc.) may be used to observe and/or evaluate a student in one embodiment. For example, a coach or professor may listen to a vocal performance (e.g., by accessing a pre-recorded performance of the student, using an audio conferencing software, etc.) of a student and evaluate the student's performance based upon the presented audio. Further, regions of GUI 1800 may enable timing (e.g., using graphical objects 1820 and 1830 to time the session whose duration is displayed in region 1840) and/or automated billing of the audio performance (e.g., based upon the elapsed time displayed in region 1840, based upon the remaining amount of purchased time displayed in region 1860, etc.).

Figure 19:
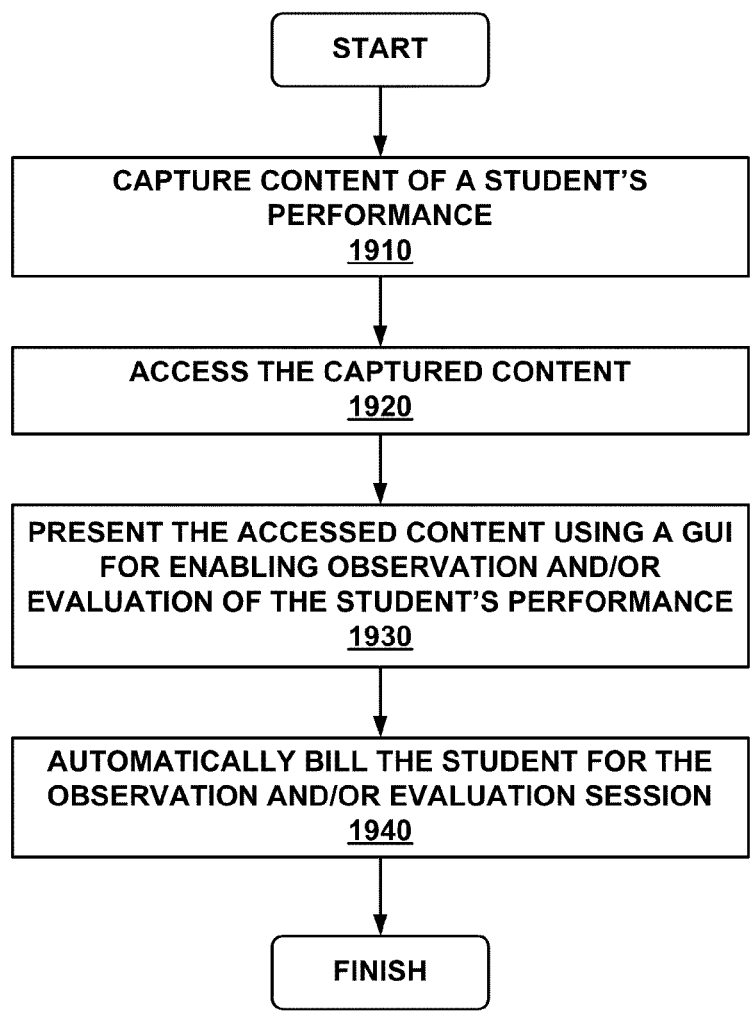
FIG. 19 shows an exemplary computer-implemented process for initiating a GUI for enabling observation and evaluation of a user in accordance with one embodiment of the present invention.

FIG. 19 shows exemplary computer-implemented process 1900 for initiating a GUI for enabling observation and evaluation of a user in accordance with one embodiment of the present invention. As shown in FIG. 19, step 1910 involves capturing content of a student's performance. Capturing may comprise storing the content (e.g., video, still images, audio, video and audio, etc.), generating a live feed of the content, digitizing the content, transforming the content (e.g., transforming light and/or sound into a signal or data used to reproduce the light and/or sound, etc.), etc. The performance may be related to a predetermined subject matter (e.g., taught using an interactive educational tool implemented using GUI 300). Video content and/or still image content may be captured by a camera (e.g., a web camera, other still-image camera, other video camera, etc.) and accessed by a computer system (e.g., 110a) of the student. Audio content may be captured by a microphone or the like and accessed by a computer system (e.g., 110a) of the student.

Step 1920 involves accessing the captured content. The captured content (e.g., captured in step 1910) may be accessed by a computer system (e.g., 110b) of a coach or professor. In another embodiment, the captured content may be accessed by an interface component (e.g., 120) coupled to the student's computer system (e.g., 110a) and/or a computer system of a coach or professor (e.g., 110b).

As shown in FIG. 19, step 1930 involves presenting the accessed content using a GUI for enabling observation and/or evaluation of the student's performance. The GUI (e.g., 1800) may enable a coach or professor to observe and/or evaluate a student's performance (e.g., by displaying video or pictures of the performance captured in step 1910, playing audio of the performance captured in step 1910, etc.) related to the predetermined subject matter. In one embodiment, the content may be presented in real-time, thereby enabling the observation and/or evaluation in real-time. Additionally, the content may be communicated via a communication channel (e.g., implemented using interface 120 and/or other networking components) formed between the computer system presenting GUI 1800 (e.g., computer system 110a) and the coach's or professor's computer system (e.g., 110c).

Step 1940 involves automatically billing the student for the observation and/or evaluation session. In one embodiment, automated billing may be implemented by deducting a determined length of the session from units of time purchased by the student. The duration of the session may be determined using a timer (e.g., presented to a coach or professor using GUI 1800) which may be started and stopped based upon user inputs (e.g., by a coach or professor interacting with graphical objects 1820 and 1830 of GUI 1800). Alternatively, the duration of the session may be automatically determined (e.g., based upon the duration of the video and/or audio captured).

Electronic Flashcards

Figure 20A:
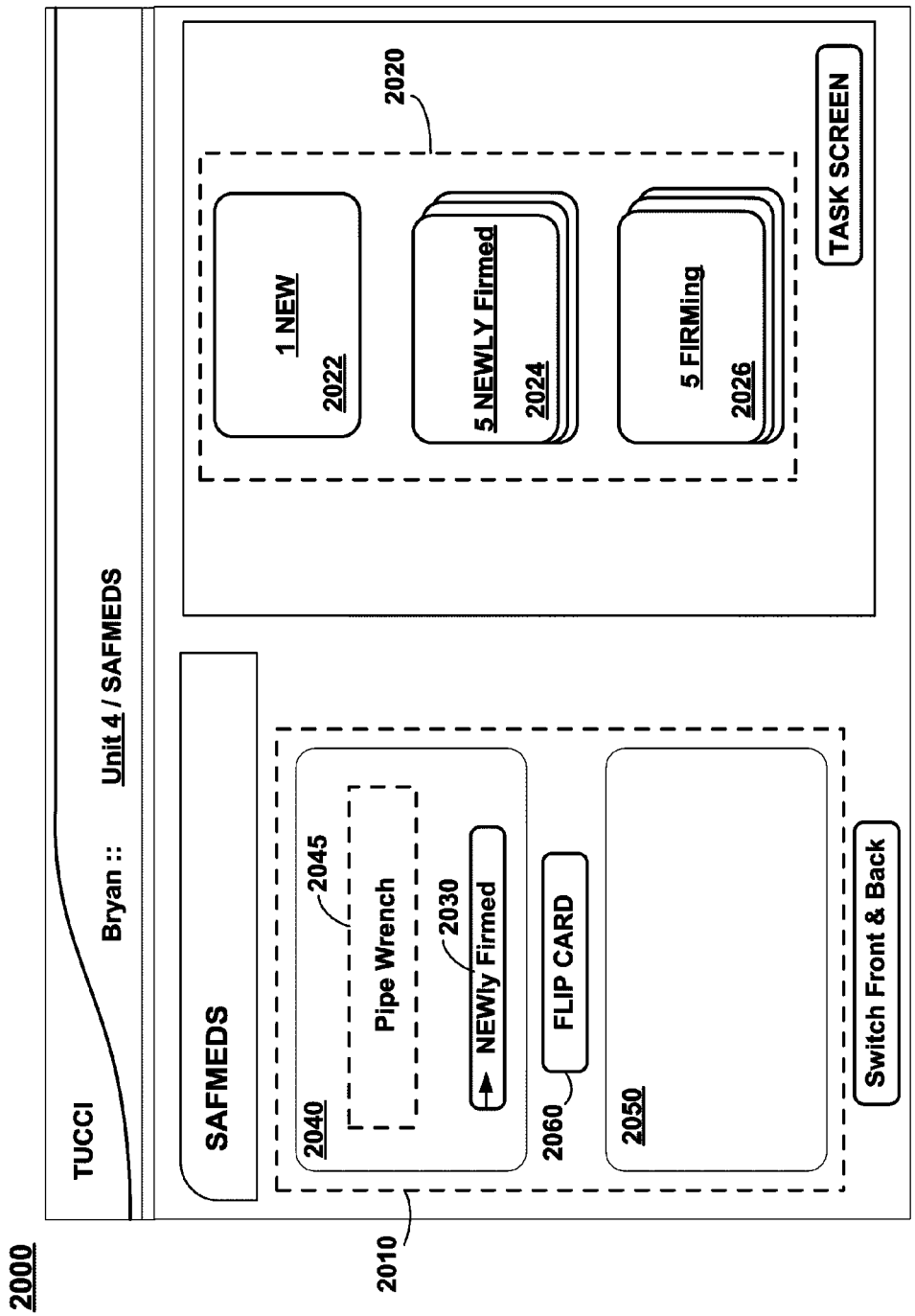
FIG. 20A shows an exemplary GUI for implementing electronic flashcards in accordance with one embodiment of the present invention.

FIG. 20A shows exemplary GUI 2000 for implementing electronic flashcards in accordance with one embodiment of the present invention. As used herein, the term "electronic flashcard" can mean a visual representation of one or both sides of a flashcard, where the visual representation may be displayed on a display device coupled to a computer system (e.g., 110a, 110b, 110c, 200, etc.). One side of the electronic flashcard may remain hidden until it is selectively revealed or displayed (e.g., in response to a user input or interaction with GUI 2000), where the selective revealing or displaying may comprise a "flipping" of the electronic flashcard in one embodiment. Additionally, the term "hidden" as used herein can mean not displayed, displayed so that it is less visible, etc.

As shown in FIG. 20A, GUI 2000 comprises region 2010 for displaying one or both sides of an electronic flashcard (e.g., an "active" electronic flashcard). Additionally, region 2020 comprises multiple piles or stacks (e.g., 2022-2026) for storing electronic flashcards which are not currently being viewed (e.g., "inactive" electronic flashcards). In one embodiment, the electronic flashcards implemented using GUI 2000 may comprise SAFMEDS cards.

Electronic flashcards may be transferred between regions 2010 and 2020 by interacting with one or more regions of GUI 2000. For example, graphical object 2030 may be used to automatically transfer an active electronic flashcard from region 2010 to region 2020 in one embodiment. Alternatively, interaction with one or both sides of the active flashcard displayed in region 2010 (e.g., by (e.g., by moving an on-screen cursor over one or both sides and clicking a mouse button, by moving an on-screen cursor over one or both sides and double-clicking a mouse button, etc.) may transfer an active electronic flashcard from region 2010 to region 2020. Additionally, interaction with an inactive electronic flashcard in one of the piles of region 2020 and/or interaction with a graphical object (e.g., of GUI 2000) may automatically transfer one or more selected electronic flashcards from region 2020 to region 2010.

In one embodiment, limitations may be placed on the transferring of electronic flashcards between regions 2010 and 2020. For example, a user may be required to view or otherwise interact with an electronic flashcard in region 2010 (e.g., one time, multiple times, etc.) before transferring it to portion 2020. As such, embodiments may improve learning of the material presented using GUI 2000 by increasing user interaction with the material presented using the electronic flashcards of GUI 2000.

Figure 20B:
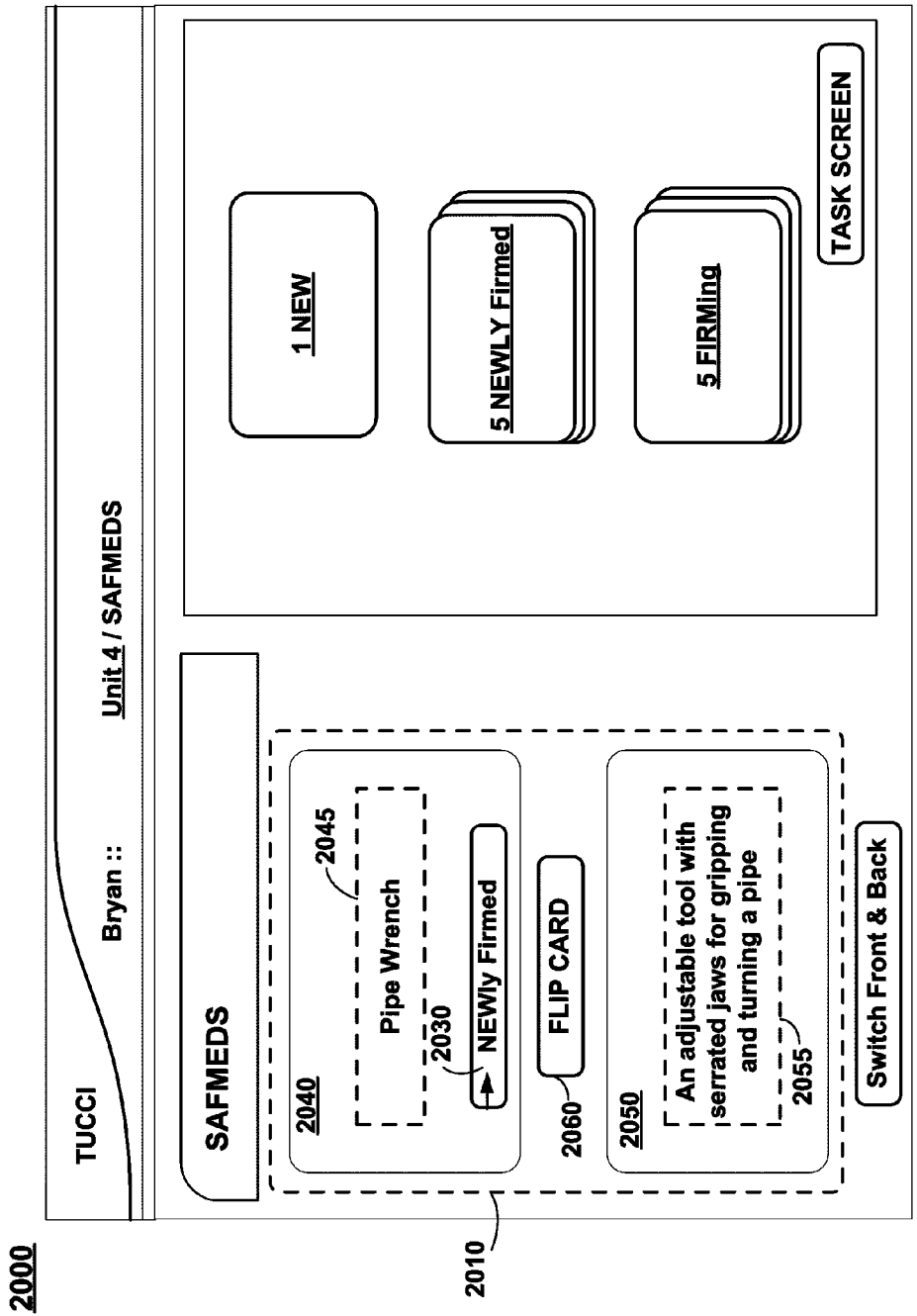
FIG. 20B shows an exemplary flipping of an electronic flashcard in accordance with one embodiment of the present invention.

As shown in FIG. 20A, region 2010 comprises region 2040 (e.g., a first side of an active electronic flashcard) for displaying first set of information 2045. Information 2045 displayed in region 2040 may remain visible while a second set of information to be displayed in region 2050 (e.g., a second side of the active electronic flashcard) is hidden. Interaction with graphical object 2060 may "flip" the flashcard and display the second set of information (e.g., 2055) as depicted in FIG. 20B. Information 2045 and information 2055 may both be associated with a predetermined subject matter (e.g., taught using an interactive educational tool implemented using GUI 300). As such, in one embodiment, a user may learn the first and/or second sets of information by viewing the information displayed in region 2040 (e.g., information 2045), attempting to recite the information hidden in region 2050 (e.g., information 2055), interacting with graphical object 2060 to display information 2055 in region 2050, and then checking the recited information against information 2055.

Information 2045 and/or information 2055 may comprise text (e.g., a word, phrase, term, definition of the term, etc.), colors, patterns, etc. Additionally, information 2045 and information 2055 may be related (e.g., to one another and a predetermined subject matter) such that a user may view one set of information and test his or her knowledge of the other (e.g., by trying to recite the hidden information). For example, information 2045 displayed in region 2040 may comprise a term (e.g., the words "pipe wrench"), while information 2055 to be selectively displayed in region 2050 may comprise a definition of the term displayed in region 2040, where information 2045 and information 2055 are related to a predetermined subject matter (e.g., plumbing). As such, a user may attempt to recite information 2055 (e.g., a definition of "pipe wrench") after looking at information 2045 (e.g., the term "pipe wrench") but before the display of information 2055 in region 2050, thereby using the electronic flashcards implemented using GUI 2000 to learn about the predetermined subject matter (e.g., plumbing).

Thus, embodiments improve learning (e.g., of a predetermined subject matter) by increasing the amount of information or content which may be displayed on the electronic flashcards compared with conventional, handwritten flashcards. For example, electronic information or content to be displayed on the electronic flashcards may be relatively small (e.g., occupy a relatively small amount of storage space) and/or be accessed from one or more sources (e.g., local hard drives, remote computer systems, etc.). Additionally, the electronic flashcards are less likely to be damaged, lost, or stolen given that they are in electronic form. Further, the information on each side of the electronic flashcards may be automatically generated (e.g., based upon a lesson plan of another module, based upon a user-defined subject matter, etc.) in one embodiment, thereby reducing the time and effort to create the flashcards.

In another embodiment, information 2045 may comprise a picture (e.g., of a pipe wrench) or video (e.g., of a plumber using a pipe wrench). As such, a user may attempt to recite information 2055 (e.g., a definition of a "pipe wrench," the term "pipe wrench," etc.) after looking at information 2045 (e.g., a picture or video showing a pipe wrench) but before the display of information 2055 in region 2050, thereby using the electronic flashcards implemented using GUI 2000 to learn about the predetermined subject matter (e.g., plumbing).

Thus, embodiments may further improve learning (e.g., of a predetermined subject matter) by further increasing the amount of information or content which may be displayed on the electronic flashcards compared with conventional, handwritten flashcards. For example, video and/or audio content may be presented to a user, thereby improving learning by presenting information in different forms to stimulate more senses of a user (e.g., catering to visual learners, audio learners, etc.). Additionally, the presentation of information in different forms can increase repetition of information to improve information absorption/retention.

Figure 20C:
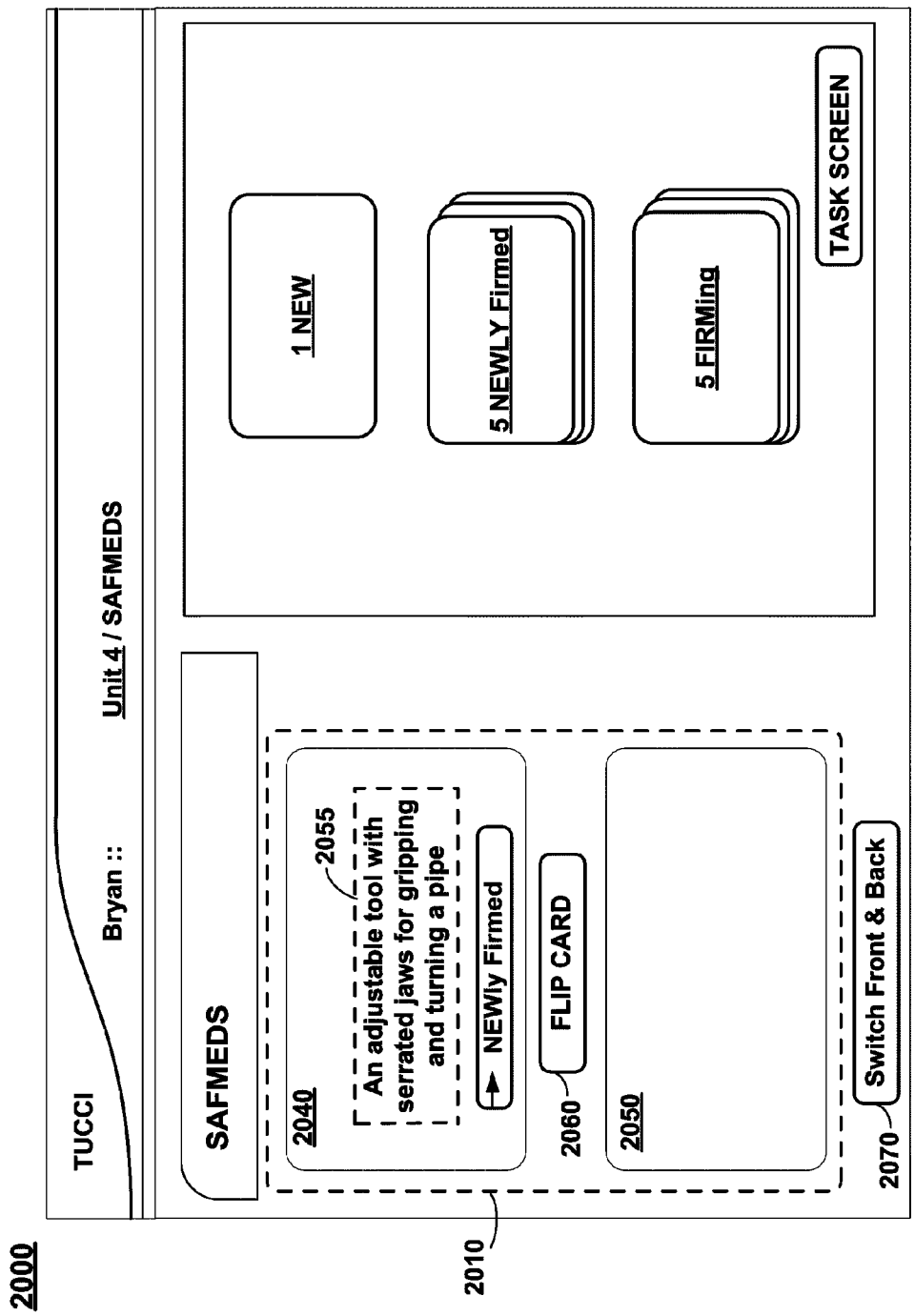
FIG. 20C shows an exemplary swapping of front and back sides of an electronic flashcard in accordance with one embodiment of the present invention.
Figure 20D:
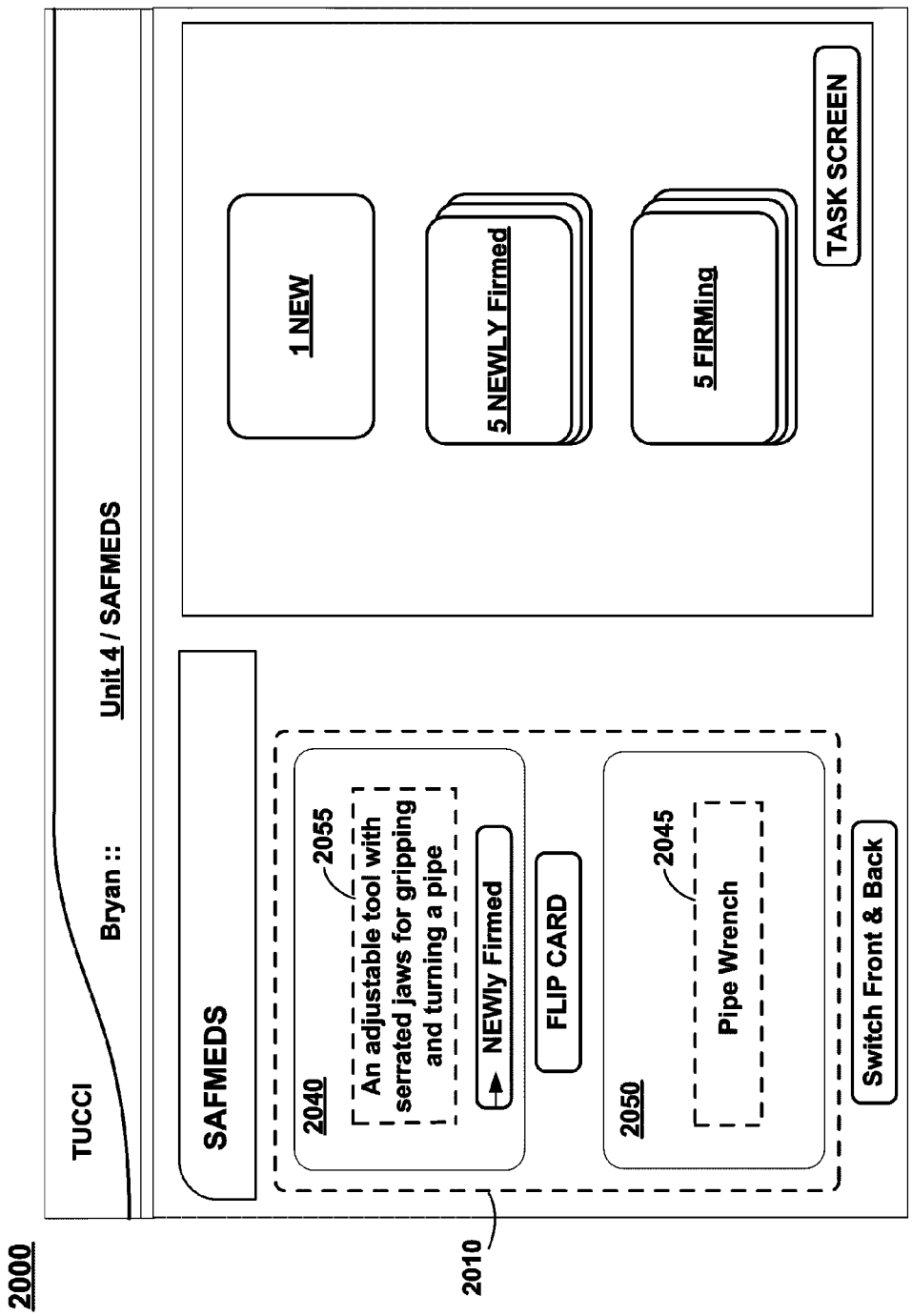
FIG. 20D shows an exemplary flipping of an electronic flashcard with front and back sides swapped in accordance with one embodiment of the present invention.

As shown in FIG. 20C, interaction with graphical object 2070 may initiate display of second set of information 2055 in region 2040 (e.g., while first set of information 2045 is hidden). Additionally, interaction with graphical object 2070 may associate first set of information 2045 with region 2050 such that a subsequent interaction with graphical object 2060 may initiate display of information 2045 in region 2050 (e.g., as depicted in FIG. 20D). As such, interaction with graphical object 2070 may effectively switch the front and back sides of the electronic flashcard in one embodiment. Thus, embodiments further improve learning by enabling both sets of information (e.g., 2045 and 2055) to be selectively hidden and revealed (e.g., in region 2050 using graphical object 2060), thereby enabling users to test their memorization, learning, understanding, etc. of both sets of information (e.g., 2045 and 2055).

As shown in FIG. 20A, region 2020 comprises stacks 2022-2026 for storing electronic flashcards which are not currently being viewed (e.g., "inactive" electronic flashcards). Stack 2022 may comprise electronic flashcards which have not yet been accessed or viewed (e.g., transferred to region 2010). In one embodiment, electronic flashcards may automatically accumulate in stack 2022 as a user progresses through a lesson and encounters or accesses new subject matter (e.g., to be placed on one or more electronic flashcards).

Stack 2024 and/or stack 2026 may comprise electronic flashcards which have been previously accessed or viewed (e.g., transferred from region 2010 to region 2020). In one embodiment stacks 2024 and 2026 may comprise electronic flashcards sorted based upon based upon user-confidence level with the subject matter of the electronic flashcards. For example, stack 2024 may comprise electronic flashcards with subject matter which a user is less comfortable with (e.g., has not memorized, etc.), while stack 2026 may comprise electronic flashcards with subject matter which a user is more confident with (e.g., has memorized, etc.). Alternatively, stacks 2024 and 2026 may comprise electronic flashcards sorted by subject matter (e.g., electronic flashcards with different types of plumbing tools in stack 2024, electronic flashcards with different plumbing techniques in stack 2026, etc.) and/or grouped based upon other characteristics.

As such, embodiments enable users to sort, group, or otherwise place electronic flashcards in one or more stacks (e.g.,

2024, 2026, etc.), thereby improving learning (e.g., of the predetermined subject matter) by enabling users to separate out and focus on the more troublesome material (e.g., displayed or stored in stack 2024) while devoting less attention to the material which the user is more comfortable with (e.g., displayed or stored in stack 2026). The number of electronic flashcards in a given stack (e.g., 2022, 2024, 2026, etc.) may also be reduced by placing the electronic flashcards into a larger number of stacks. Thus, the material presented using the electronic flashcards may be more easily learned by enabling users may focus on a smaller amount of material at a given time.

In one embodiment, the number of cards placed on at least one stack (e.g., 2022, 2024, 2026, etc.) of region 2020 may be limited. For example, once a stack (e.g., 2022, 2024, 2026, etc.) reaches its predetermined limit, one or more electronic flashcards may be removed before allowing additional electronic flashcards to be placed the stack. As a further example, stack 2022 may have a limit of one card and stack 2024 may have a limit of six cards, while stack 2026 may have no limit or a user-defined limit. In this manner, learning may be improved by encouraging and/or forcing a user to learn the previously-accessed material before moving on to additional material.

Figure 20E:
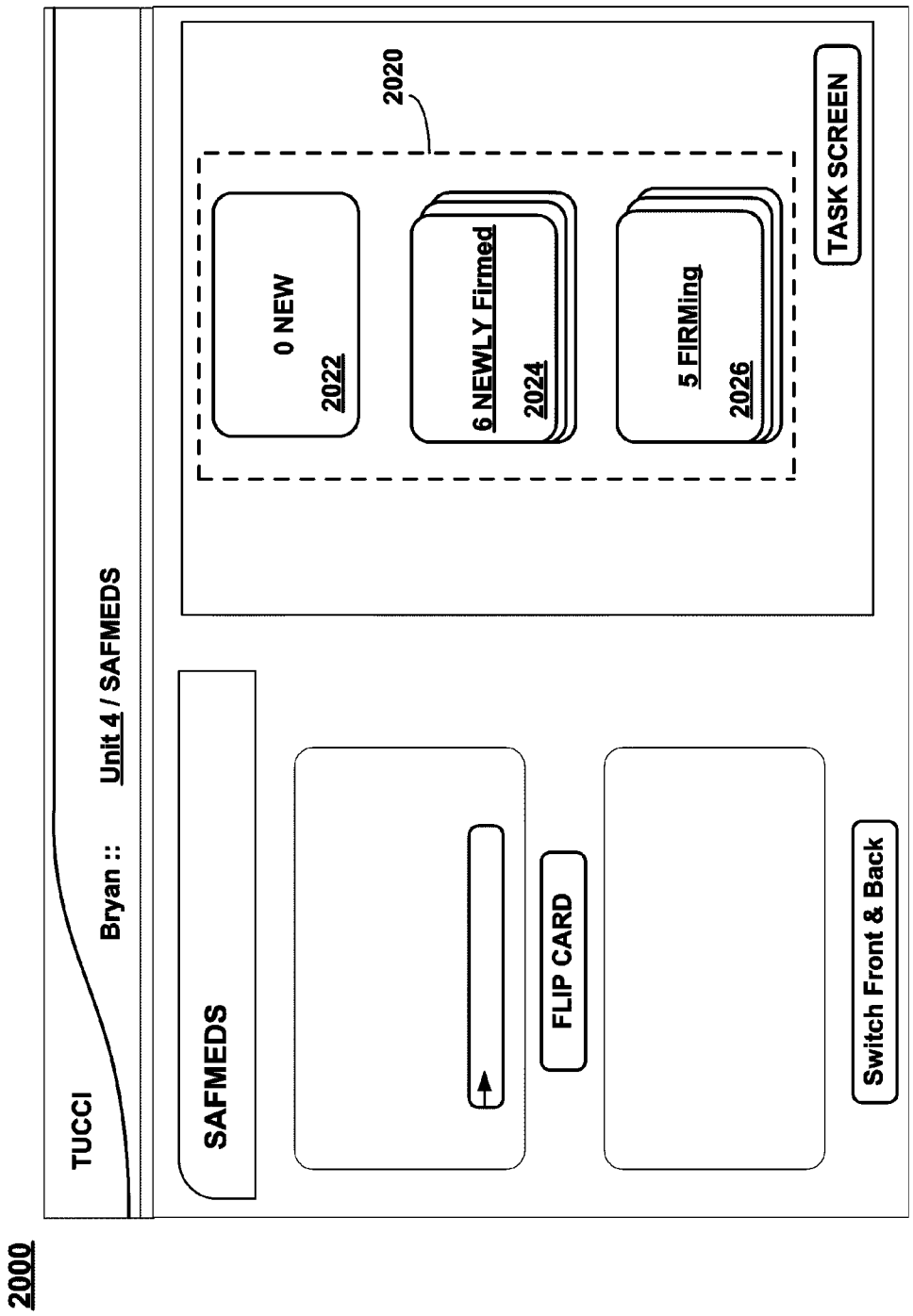
FIG. 20E shows an exemplary stack of electronic flashcards which have reached a predetermined limit on the number of electronic flashcards in the stack in accordance with one embodiment of the present invention.

As shown in FIG. 20E, stack 2024 may have reached a predetermined limit (e.g., as indicated by a visual attribute, e.g., the darker color or shade of stack 2024) of six electronic flashcards, thereby requiring removal of an electronic flashcard from stack 2024 (e.g., by moving an electronic flashcard from stack 2024 to stack 2026, by moving an electronic flashcard from stack 2024 to region 2010 for viewing, etc.) before another electronic flashcard may be located on stack 2024. Thus, embodiments reduce the review time for each stack and enable users to more effectively, quickly, and easily learn the material (e.g., using the SAFMEDS method of periodically performing short review sessions).

Additionally, GUI 2000 may enable automated shuffling of the electronic flashcards in one or more stacks (e.g., 2022, 2024, 2026, etc.) of region 2020. The shuffling may be initiated by interacting with one or more graphical objects of GUI 2000 (not shown in FIG. 20A), by interacting with a region of GUI 2000 (e.g., activating or selecting an electronic flashcard from region 2020, clicking or double-clicking a stack in region 2020, etc.), etc. As such, embodiments enable more randomized and improved shuffling over manual shuffling of conventional flashcards, thereby improving learning of the material. Additionally, in one embodiment, the automatic shuffling of GUI 2000 may enable users to use the electronic flashcards in accordance with the SAFMEDS method.

Further, in one embodiment, GUI 2000 may enable one or more electronic flashcards (e.g., displayed within region 2010 and/or 2020) to be printed. As such, users may conveniently and quickly generate hard-copy flashcards (e.g., printed on paper, cardstock, index cards, etc.) for reviewing the material of the electronic flashcards in hard-copy form. As such, if any of the cards are damaged, lost, stolen, etc., one or more of the flashcards may be conveniently and quickly re-printed.

Although FIGS. 20A-20E display only one active electronic flashcard in region 2010, it should be appreciated that more than one active electronic flashcard may be displayed in region 2010 in other embodiments. Additionally, although region 2020 comprises three stacks (e.g., 2022, 2024, and 2026) in FIGS. 20A-20E, it should be appreciated that region 2020 may comprise a larger or smaller number of stacks in other embodiments.

FIG. 21 shows exemplary computer-implemented process 2100 for implementing electronic flashcards in accordance with one embodiment of the present invention. As shown in FIG. 21, step 2110 involves displaying a first set of information (e.g., 2045) associated with a predetermined subject matter in a first area (e.g., 2040) of a GUI (e.g., 2000 as depicted in FIGS. 20A-20E) while a second set of information (e.g. 2055) associated with the predetermined subject matter remains hidden. In one embodiment, the first set of information (e.g., 2045) may comprise text (e.g., a word, phrase, term, etc.), colors, patterns, graphical information (e.g., still images, video, etc.), or the like.

Step 2120 involves determining whether a request to display the second set of information (e.g., 2055) in the first area (e.g., 2040) has been detected. If a request to display the second set of information (e.g., 2055) in the first area (e.g., 2040) has not been detected, then step 2130 may be performed.

As shown in FIG. 21, step 2130 involves detecting a user input requesting display of the second set of information (e.g., 2055). The user input may comprise an interaction with a graphical object (e.g., 2060 of FIGS. 20A-20E) of the GUI (e.g., 2000) displaying the first set of information (e.g., 2045) in step 2110.

Step 2140 involves displaying the second set of information (e.g., 2055) in a second area (e.g., 2050) of the GUI (e.g., 2000). In one embodiment, the second set of information (e.g., 2055) may comprise text (e.g., a word, phrase, definition of a term, etc.), colors, patterns, graphical information (e.g., still images, video, etc.), or the like.

As shown in FIG. 21, step 2150 involves automatically hiding the second set of information (e.g., 2055) after a predetermined period of time. Alternatively, the second set of information (e.g., 2055) may be hidden in response to a user input (e.g., to GUI 2000).

If it is determined in step 2120 that a request to display the second set of information (e.g., 2055) in the first area (e.g., 2040) has been detected, then the second set of information (e.g., 2055) may be displayed in the first area (e.g., 2040) of the GUI (e.g., 2000) in step 2160. The second set of information (e.g., 2055) may be displayed in the first area (e.g., 2040) while the first set of information (e.g. 2045) remains hidden.

As shown in FIG. 21, step 2170 involves detecting a user input requesting display of the first set of information (e.g., 2045). The user input may comprise an interaction with a graphical object (e.g., 2060) of the GUI (e.g., 2000) displaying the second set of information (e.g., 2055) in step 2160.

Step 2180 involves displaying the first set of information (e.g., 2045) in the second area (e.g., 2050) of the GUI (e.g., 2000). In one embodiment, the first set of information (e.g., 2045) may comprise text (e.g., a word, phrase, definition of a term, etc.), colors, patterns, graphical information (e.g., still images, video, etc.), or the like.

As shown in FIG. 21, step 2190 involves automatically hiding the first set of information (e.g., 2045) after a predetermined period of time. Alternatively, the first set of information (e.g., 2045) may be hidden in response to a user input (e.g., to GUI 2000).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of implementing electronic flashcards, said method comprising:

generating data, using a computer system, operable to display a first set of information in a first display region of a graphical user interface, wherein said generating data operable to display said first set of information further comprises generating data operable to display said first set of information while a second set of information is not displayed, and wherein said first and second sets of information are associated with a first electronic flashcard;

generating data operable to display said second set of information in a second display region of said graphical user interface, wherein said generating data operable to display said second set of information further comprises generating data operable to display said second set of information responsive to a request to display said second set of information;

generating data to automatically reduce visibility of said second set of information responsive to an expiration of a predetermined duration following display of said second set of information; and generating data operable to display a second electronic flashcard in a third display region of said graphical user interface, wherein said second electronic flashcard is displayed contemporaneously with at least one of said first set of information, and said second set of information associated with said first electronic flashcard.

2. The method of claim 1 further comprising:

generating data operable to display, responsive to a user interaction with said third display region, a third set of information in said first display region of a graphical user interface, wherein said generating data operable to display said third set of information further comprises generating data operable to display said third set of information while a fourth set of information is not displayed, and wherein said third and fourth sets of information are associated with said second electronic flashcard.

3. The method of claim 2 further comprising:

generating data operable to display said fourth set of information in said second display region of said graphical user interface, wherein said generating data operable to display said fourth set of information further comprises generating data operable to display said fourth set of information responsive to a request to display said fourth set of information.

4. The method of claim 1 further comprising:

generating data operable to display said second set of information in said first display region while said first set of information is not displayed; and generating data operable to display said first set of information in said second display region responsive to a request to display said first set of information.

5. The method of claim 1 further comprising:

generating data to display said first electronic flashcard in said third display region responsive to a request to transfer said first electronic flashcard to said third display region.

6. The method of claim 1, wherein a first section of said third display region is used to display at least one electronic flashcard that has not yet been accessed by a user, and wherein a second section of said third display region is used to display at least one electronic flashcard that has been previously accessed by a user.

7. The method of claim 1, wherein said first set of information is selected from a group consisting of a word, a phrase, and a picture.

8. The method of claim 1, wherein said second set of information is selected from a group consisting of a definition of said first set of information and additional information about said first set of information.

9. A non-transitory computer-readable medium having a plurality of computer-readable program instructions embodied therein for causing a computer system to perform a method of implementing electronic flashcards, said program instructions comprising:

instructions to generate data operable to display a first set of information in a first display region of a graphical user interface, wherein said instructions to generate data operable to display said first set of information further comprises instructions to generate data operable to display said first set of information while a second set of information is not displayed, and wherein said first and second sets of information are associated with a first electronic flashcard;

instructions to generate data operable to display said second set of information in a second display region of said graphical user interface, wherein said instructions to generate data operable to display said second set of information further comprises instructions to generate data operable to display said second set of information responsive to a request to display said second set of information;

instructions to generate data to automatically reduce visibility of said second set of information responsive to an expiration of a predetermined duration following display of said second set of information; and instructions to generate data operable to display a second electronic flashcard in a third display region of said graphical user interface contemporaneously with at least one of said first set of information, and said second set of information associated with said first electronic flashcard.

10. The non-transitory computer-readable medium of claim 9, wherein said program instructions further comprises:

instructions to generate data operable to display, responsive to a user interaction with said third display region, a third set of information in said first display region of a graphical user interface, wherein said instructions to generate data operable to display said third set of information further comprises instructions to generate data operable to display said third set of information while a fourth set of information is not displayed, and wherein said third and fourth sets of information are associated with said second electronic flashcard.

11. The non-transitory computer-readable medium of claim 10, wherein said program instructions further comprises:

instructions to generate data operable to display said fourth set of information in said second display region of said graphical user interface, wherein said instructions to generate data operable to display said fourth set of information further comprises instructions to generate data operable to display said fourth set of information responsive to a request to display said fourth set of information.

12. The non-transitory computer-readable medium of claim 9, wherein said program instructions further comprises:

instructions to generate data operable to display said second set of information in said first display region while said first set of information is not displayed; and instructions to generate data operable to display said first set of information in said second display region responsive to a request to display said first set of information.

13. The non-transitory computer-readable medium of claim 9, wherein said program instructions further comprises:

instructions to generate data to display said first electronic flashcard in said third display region responsive to a request to transfer said first electronic flashcard to said third display region.

14. The non-transitory computer-readable medium of claim 9, wherein a first section of said third display region is used to display at least one electronic flashcard that has not yet been accessed by a user, and wherein a second section of said third display region is used to display at least one electronic flashcard that has been previously accessed by a user.

15. The non-transitory computer-readable medium of claim 9, wherein said first set of information is selected from a group consisting of a word, a phrase, and a picture.

16. The non-transitory computer-readable medium of claim 9, wherein said second set of information is selected from a group consisting of a definition of said first set of information and additional information about said first set of information.

17. A system comprising a processor and a memory, wherein said memory comprises instructions that when executed by said system implement a method of implementing electronic flashcards, said method comprising:

generating data operable to display a first set of information in a first display region of a graphical user interface, wherein said generating data operable to display said first set of information further comprises generating data operable to display said first set of information while a second set of information is not displayed, and wherein said first and second sets of information are associated with a first electronic flashcard;

generating data operable to display said second set of information in a second display region of said graphical user interface, wherein said generating data operable to display said second set of information further comprises generating data operable to display said second set of information responsive to a request to display said second set of information;

generating data to automatically reduce visibility of said second set of information responsive to an expiration of a predetermined duration following display of said second set of information; and generating data operable to display a second electronic flashcard in a third display region of said graphical user interface contemporaneously with at least one of said first set of information, and said second set of information associated with said first electronic flashcard.

18. The system of claim 17, wherein said method further comprises:

generating data operable to display, responsive to a user interaction with said third display region, a third set of information in said first display region of a graphical user interface, wherein said generating data operable to display said third set of information further comprises generating data operable to display said third set of information while a fourth set of information is not displayed, and wherein said third and fourth sets of information are associated with said second electronic flashcard.

19. The system of claim 18, wherein said method further comprises:

generating data operable to display said fourth set of information in said second display region of said graphical user interface, wherein said generating data operable to display said fourth set of information further comprises generating data operable to display said fourth set of information responsive to a request to display said fourth set of information.

20. The system of claim 17, wherein said method further comprises:

generating data operable to display said second set of information in said first display region while said first set of information is not displayed; and generating data operable to display said first set of information in said second display region responsive to a request to display said first set of information.

21. The system of claim 17, wherein said method further comprises:

generating data to display said first electronic flashcard in said third display region responsive to a request to transfer said first electronic flashcard to said third display region.

22. The system of claim 17, wherein a first section of said third display region is used to display at least one electronic flashcard that has not yet been accessed by a user, and wherein a second section of said third display region is used to display at least one electronic flashcard that has been previously accessed by a user.

23. The system of claim 17, wherein said first set of information is selected from a group consisting of a word, a phrase, and a picture.

24. The system of claim 17, wherein said second set of information is selected from a group consisting of a definition of said first set of information and additional information about said first set of information.

* * * * *